(12) United States Patent
Turunen et al.

(10) Patent No.: US 9,485,673 B2
(45) Date of Patent: *Nov. 1, 2016

(54) METHOD AND APPARATUS FOR COORDINATING INFORMATION REQUEST MESSAGES OVER AN AD-HOC MESH NETWORK

(71) Applicant: Nokia Technologies Oy, Espoo (FI)

(72) Inventors: Markku Tapio Turunen, Helsinki (FI); Kari Juhani Leppanen, Helsinki (FI); Francis Pak Kwan Tam, Helsinki (FI); Kimmo Tapani Ramo, Espoo (FI)

(73) Assignee: Nokia Technologies Oy, Espoo (FI)

(*) Notice: Subject to any disclaimer, the term of this patent is extended or adjusted under 35 U.S.C. 154(b) by 0 days.

This patent is subject to a terminal disclaimer.

(21) Appl. No.: 14/466,592

(22) Filed: Aug. 22, 2014

(65) Prior Publication Data

US 2014/0362847 A1 Dec. 11, 2014

Related U.S. Application Data

(63) Continuation of application No. 13/307,924, filed on Nov. 30, 2011, now Pat. No. 8,848,721.

(60) Provisional application No. 61/418,306, filed on Nov. 30, 2010.

(51) Int. Cl.
| | |
|---|---|
| *H04L 12/28* | (2006.01) |
| *H04W 24/02* | (2009.01) |
| *H04W 4/00* | (2009.01) |
| *H04W 4/06* | (2009.01) |
| *H04W 4/20* | (2009.01) |
| *H04W 28/02* | (2009.01) |
| *H04W 28/06* | (2009.01) |
| *H04W 84/18* | (2009.01) |

(52) U.S. Cl.
CPC ............ *H04W 24/02* (2013.01); *H04W 4/006* (2013.01); *H04W 4/06* (2013.01); *H04W 4/206* (2013.01); *H04W 28/0226* (2013.01); *H04W 28/06* (2013.01); *H04W 84/18* (2013.01)

(58) Field of Classification Search
CPC .......... H04W 4/006; H04W 28/0226; H04W 84/18; H04W 4/06; H04W 4/206; H04W 28/06; H04W 24/02
USPC ................ 370/235, 237, 238, 312, 390, 400
See application file for complete search history.

(56) References Cited

U.S. PATENT DOCUMENTS

| | | | |
|---|---|---|---|
| 8,149,716 B2* | 4/2012 | Ramanathan et al. ........ 370/238 |
| 2004/0022221 A1* | 2/2004 | Chwieseni et al. ........... 370/338 |
| 2007/0025258 A1* | 2/2007 | Chen .................. H04L 12/2602 370/241 |
| 2009/0210495 A1* | 8/2009 | Wolfson et al. .............. 709/205 |
| 2010/0329227 A1* | 12/2010 | Argyriou ...................... 370/338 |
| 2011/0080869 A1* | 4/2011 | Walton et al. ................ 370/328 |

* cited by examiner

*Primary Examiner* — Peter Cheng
(74) *Attorney, Agent, or Firm* — Alston & Bird LLP

(57) ABSTRACT

An approach is provided for coordinating information request messages over an ad-hoc mesh network. A module receives at least one request to transmit one or more information request messages over an ad-hoc mesh network. The module determines context information associated with at least a portion of the ad-hoc mesh network, one or more nodes within the at least a portion of the ad-hoc mesh network, or a combination thereof. The module then determines to transmit the one or more information request messages over the ad-hoc mesh network based, at least in part, on the context information.

20 Claims, 26 Drawing Sheets

FIG. 2F

| NETWORK LAYER MESSAGE HEADER 281 | | | | | | | |
|---|---|---|---|---|---|---|---|
| TX 282 (TRANSMITTER NID) | SRC 283 (SOURCE NID) | DST 284 (DESTINATION NID) | MSN 285 (MESSAGE SEQUENCE NUMBER) | HOP COUNT 286 | GEOGRAPHICAL LIMIT 287 | TEMPORAL LIMIT 288 | CONTEXT LIMIT 289 |

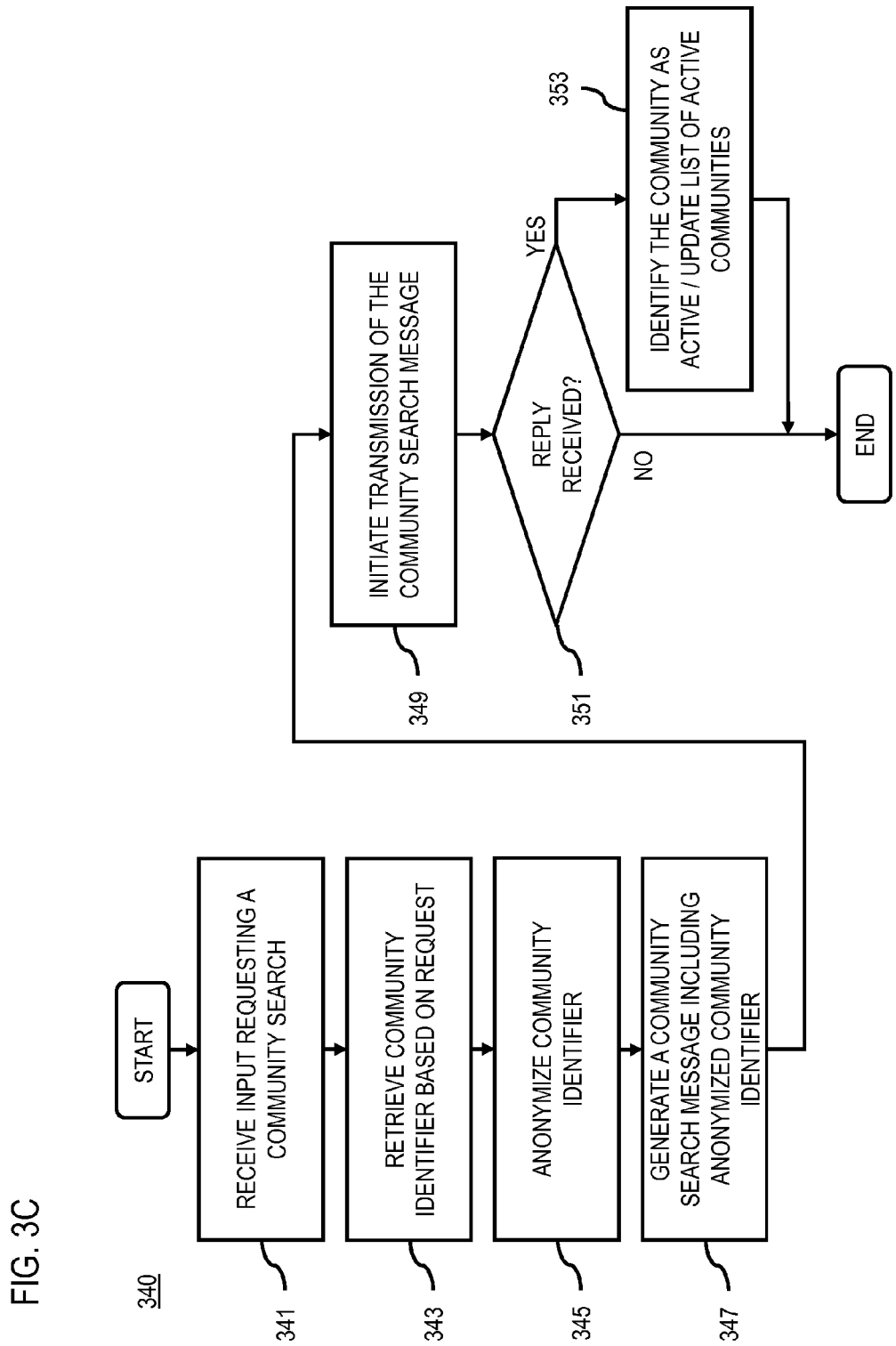

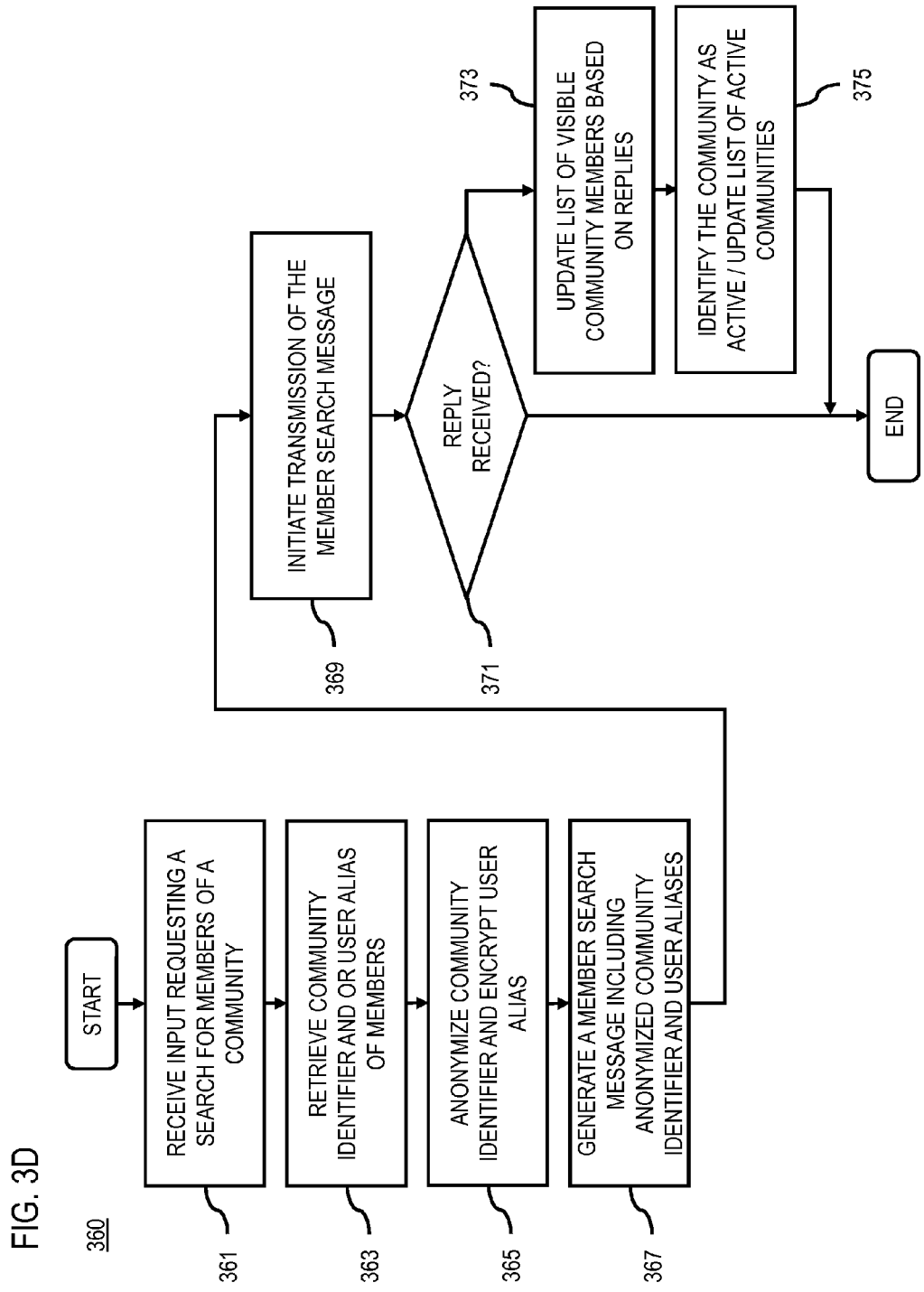

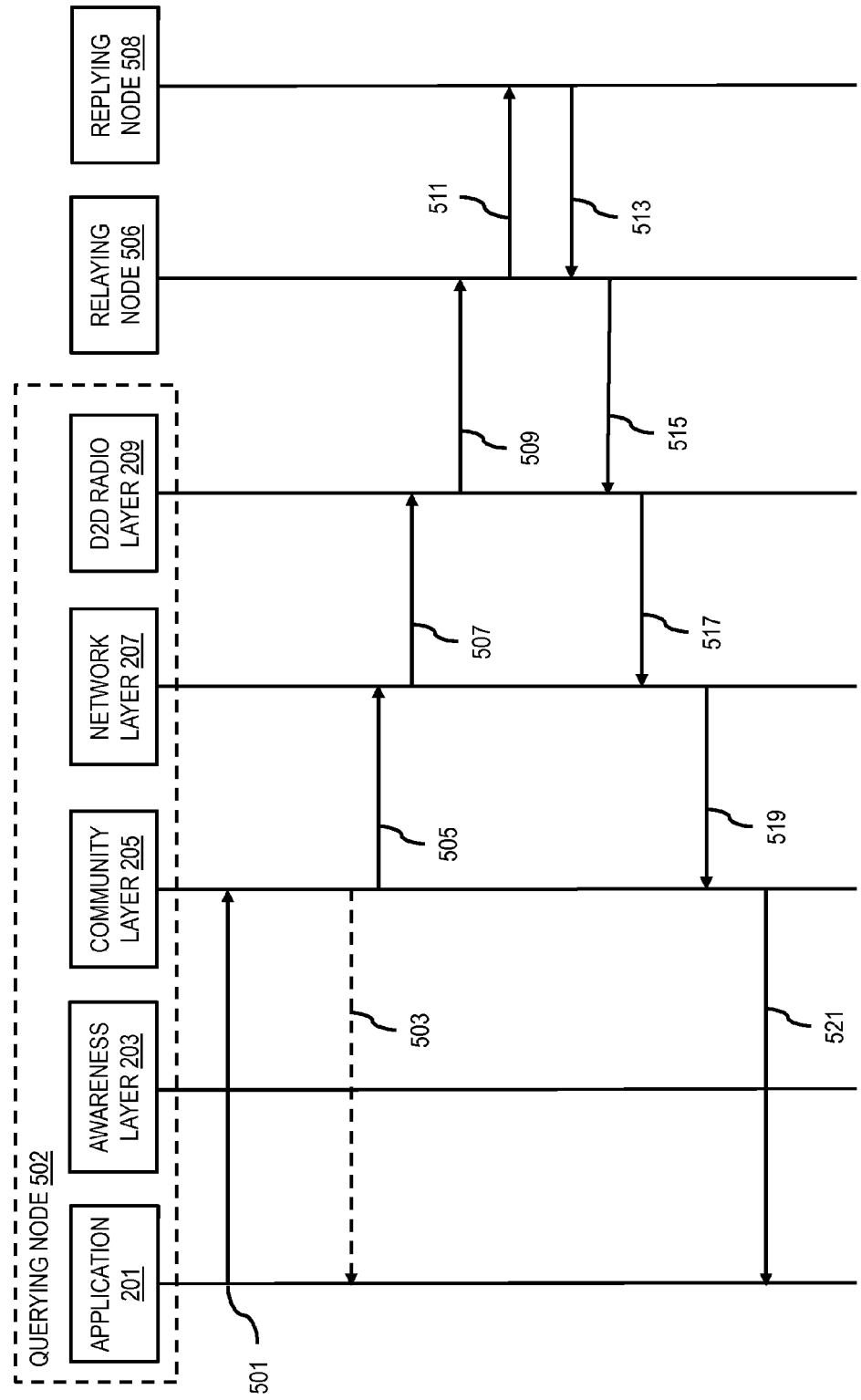

METHOD AND APPARATUS FOR COORDINATING INFORMATION REQUEST MESSAGES OVER AN AD-HOC MESH NETWORK

RELATED APPLICATIONS

This application is a Continuation of U.S. application Ser. No. 13/307,924, filed Nov. 30, 2011, which claims priority benefit to U.S. Provisional Patent Application No. 61/418,306, filed Nov. 30, 2010, the content of both of which are herein incorporated by reference in their entireties.

BACKGROUND

Wireless (e.g., cellular) service providers and device manufacturers are continually challenged to deliver value and convenience to consumers by, for example, providing compelling network services, applications, and content. One area of development is the use of communication networks and devices to automatically determine information and context about the local environment. However, technical challenges relating to power consumption, signaling overhead, security, and privacy have hindered such development.

Some Exemplary Embodiments

Therefore, there is a need for an approach for efficiently coordinating information request messages over ad-hoc mesh network to, for instance, minimize network traffic and resource use.

According to one embodiment, a method comprises receiving at least one request to transmit one or more information request messages over an ad-hoc mesh network. The method also comprises determining context information associated with at least a portion of the ad-hoc mesh network, one or more nodes within the at least a portion of the ad-hoc mesh network, or a combination thereof. The method further comprises determining to transmit the one or more information request messages over the ad-hoc mesh network based, at least in part, on the context information.

According to another embodiment, an apparatus comprising at least one processor, and at least one memory including computer program code, the at least one memory and the computer program code configured to, with the at least one processor, cause the apparatus to receive at least one request to transmit one or more information request messages over an ad-hoc mesh network. The apparatus is also caused to determine context information associated with at least a portion of the ad-hoc mesh network, one or more nodes within the at least a portion of the ad-hoc mesh network, or a combination thereof. The apparatus is further caused to determine to transmit the one or more information request messages over the ad-hoc mesh network based, at least in part, on the context information.

According to one embodiment, a computer-readable storage medium carrying one or more sequences of one or more instructions which, when executed by one or more processors, cause an apparatus to receive at least one request to transmit one or more information request messages over an ad-hoc mesh network. The apparatus is also caused to determine context information associated with at least a portion of the ad-hoc mesh network, one or more nodes within the at least a portion of the ad-hoc mesh network, or a combination thereof. The apparatus is further caused to determine to transmit the one or more information request messages over the ad-hoc mesh network based, at least in part, on the context information.

According to another embodiment, an apparatus comprises means for receiving at least one request to transmit one or more information request messages over an ad-hoc mesh network. The apparatus also comprises means for determining context information associated with at least a portion of the ad-hoc mesh network, one or more nodes within the at least a portion of the ad-hoc mesh network, or a combination thereof. The apparatus further comprises means for determining to transmit the one or more information request messages over the ad-hoc mesh network based, at least in part, on the context information.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIG. 2F is a diagram of the data structure of a network layer message header, according to an exemplary embodiment;

FIGS. 3A-3D are flowcharts of processes for locating communities and community members over an ad-hoc mesh network, according to various exemplary embodiments;

FIG. 5A is a ladder diagram that illustrates a sequence of messages and processes used in a querying node, according to an exemplary embodiment;

DESCRIPTION OF PREFERRED EMBODIMENT

A method and apparatus for coordinating information request messages over an ad-hoc mesh network are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

As used herein, the term "awareness information" refers to any information and/or context about a local environment as well as the users and communication devices within the local environment. By way of example, awareness information can be used to support applications for creating social networks, determining presence, determining contexts associated with a device, advertising, searching for information, etc. Although various exemplary embodiments are described with respect to coordinating messages generated using a publish/subscribe mechanism (e.g., as described in more detail below), it is contemplated that the various embodiments of approach described herein may be used with any type of information exchange over an ad-hoc mesh network. In addition, the term "information request messages" refers to any message or other signaling related to requesting information as well as to any message or other signaling related to responding to the request.

Figure 1:
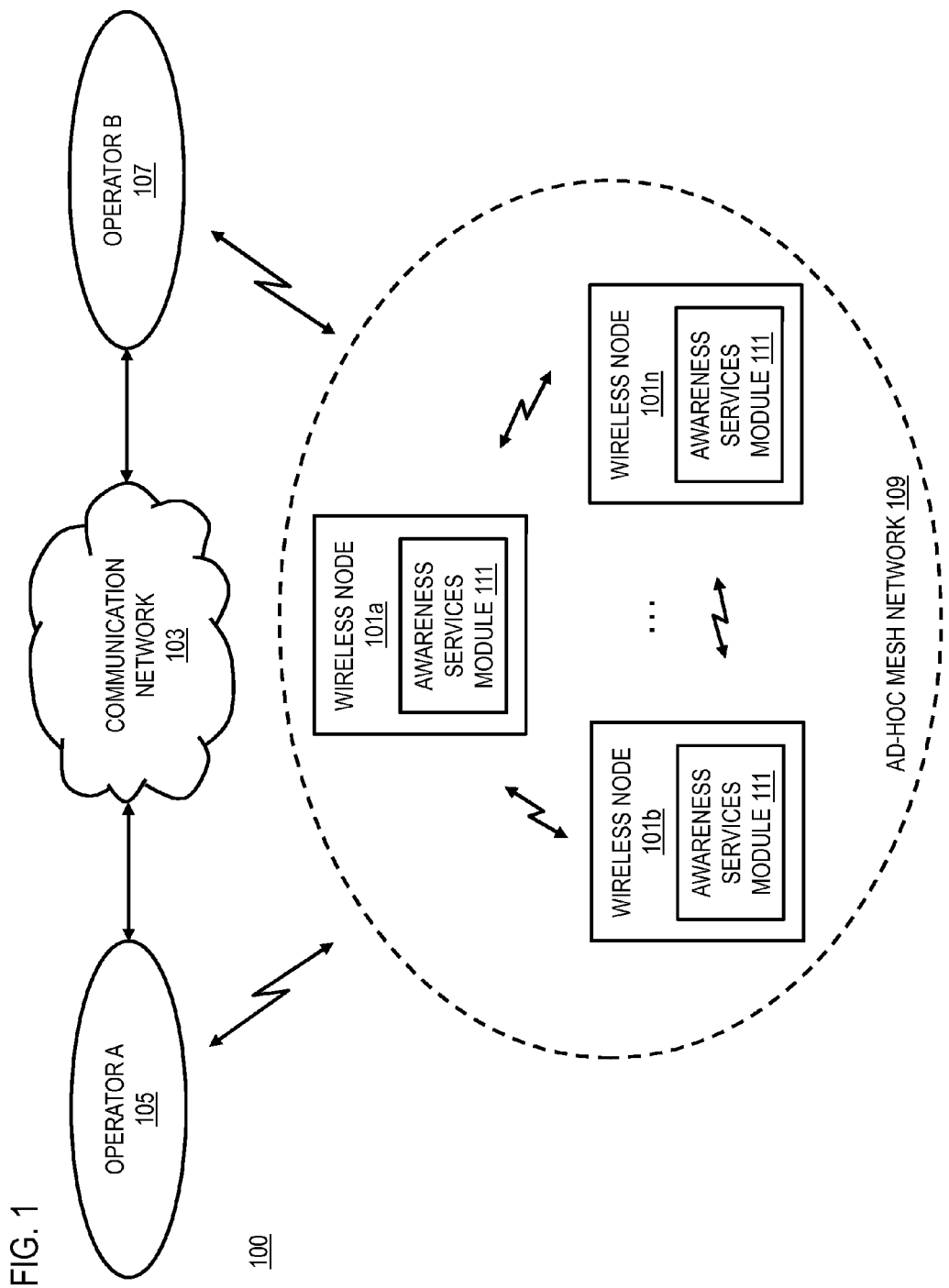
FIG. 1 is a diagram of a communication system capable of coordinating information request messages over an ad-hoc mesh network, according to an exemplary embodiment.

FIG. 1 is a diagram of a communication system capable of locating communities over an ad-hoc mesh network, according to an exemplary embodiment. Information and context comprise "awareness information" that metaphorically equip a communication device with "radio eyes and ears" to continuously collect and exchange information with other devices in a local environment. However, development of a system for providing awareness information poses significant technical challenges, particularly in the areas of creating a network for sharing awareness information, locating and organizing awareness information, forming communities for sharing awareness information, managing power consumption for devices constantly engaged in sharing awareness information, developing applications to take advantage of the awareness information, maintaining the privacy and anonymity of users sharing awareness information, and preventing the proliferation of undesired messages (e.g., spam) over the network.

One traditional method of information sharing is through a publish/subscribe paradigm whereby information owners (e.g., publishers) provide information without knowing a priori the specific receivers (e.g., subscribers) of the information or when the subscribers intend to access the information. In other words, a publish/subscribe mechanism or paradigm enables the decoupling of space (e.g., parties do not need to know each other) and time (e.g., parties do not need to be actively taking part in the interaction at the same time). Historically, implementing a publish/subscribe mechanism is based on creating or otherwise designating a central message broker for registering publishers and subscribers. The broker can then store the information from publishers and forward them to relevant subscribers. However, in the case of various embodiments of the ad-hoc mesh network described below with respect to a system 100 of FIG. 1, the serverless and transient nature of such a device-to-device network poses significant challenges for service providers and device manufacturers. Moreover, because of the limited nature of the communication channels available (e.g., using short range and often bandwidth limited wireless connections) over the device-to-device network, the service providers and device manufacturers seek to minimize the number of messages and transmissions arising from such information exchanges.

As shown in FIG. 1, the system 100 comprises one or more wireless nodes 101a-101n optionally having connectivity to a communication network 103 through either operator A 105 or operator B 107. The wireless nodes 101a-101n are mobile terminal, fixed terminal, or portable terminal including a mobile handset, station, unit, device, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, television receiver, radio broadcast receiver, electronic book device, game device, or any combination thereof, including the accessories and peripherals of these devices, or any combination thereof. It is also contemplated that the wireless nodes 101a-101n can support any type of interface to the user (such as "wearable" circuitry, etc.).

In exemplary embodiments, the wireless nodes 101a-101n form an ad-hoc mesh network 109 for sharing awareness information. The ad-hoc mesh network 109 is, for instance, a connectionless and serverless device-to-device network (e.g., a mobile ad-hoc network (MANET)) created using short-range radio technology (e.g., wireless local area network (WLAN) or Bluetooth®). Within the ad-hoc mesh network 109, each wireless node 101 may be mobile and is within communication range of any number of other wireless nodes 101. Accordingly, the set of wireless nodes 101a-101n that is within communication range of any a particular wireless node 101 is transient and can change as the wireless nodes 101a-101n move from location to location. As noted above, the serverless and transient nature of ad-hoc mesh network 109 creates challenges to implementing a publish/subscribe mechanism over the network 109.

As discussed previously, service providers and device manufacturers that are developing communication systems and networks for locating communities face many technical challenges. For example, current ad-hoc radios (e.g., WLAN and Bluetooth®) are designed for connectivity (e.g., connectivity via Internet protocol (IP)). However, in an "always on" environment such as the ad-hoc mesh network 109, it is not practical to have a large number of wireless nodes 101a-101n (e.g., mobile handset devices) "connected" by, for instance, IP to each other for extended periods of time because of power usage and scalability problems. Specifically, a multi-hop connection in a large ad-hoc network typically requires a significant amount of control signaling and power and can quickly deplete a mobile device's battery. Moreover, scalability can be a problem because current ad-hoc radios are typically limited in the number of connections and the related signaling that they can support at any given time. Another shortcoming of current ad-hoc radios is that they do not adequately protect a user's privacy because they expose the user's identity through a fixed network address (e.g., a media access control (MAC) address) associated with the user's device. These problems are also relevant to the implementation of an efficient publish/subscribe mechanism over the ad-hoc mesh network 109 and of a process for coordinating the associated information exchanges.

To address these problems, the system 100 creates the ad-hoc mesh network 109 for sharing awareness information in a connectionless fashion. As used herein, the term "connectionless" refers to the ability of a node (e.g. wireless node 101a) to send and of all surrounding nodes 101a-101n to receive awareness information without the need to send any prior control signaling. For example, sending awareness information using the transmission control protocol/IP (TCP/IP) over a WLAN ad-hoc is not connectionless because of the two-way TCP control signaling between the sending and receiving nodes used to establish the TCP connection. The awareness information is provided, for instance, in small anonymous messages that are exchanged by the wireless nodes 101a-101n automatically without user intervention. As used herein, the term "anonymous" means that it is not possible to infer the true identity of the sender from the message, unless the true identity is intentionally included in the message (e.g., by the user or another entity authorized by the user). The exchange of awareness information occurs as a broadcast message (i.e., a flooding message) from a wireless node 101 to neighboring wireless nodes 101 that are within range of the radio of the broadcasting wireless node 101. As neighboring wireless nodes 101 receive the broadcasted message, each receiving wireless node 101 may in turn rebroadcast the message to other neighboring wireless nodes 101. In this way, the originally broadcasted message propagates throughout the ad-hoc mesh network 109. In exemplary embodiments, the extent of the propagation may be limited by criteria such as distance, location, time, etc.

Unlike traditional systems, such messages typically are for carrying awareness information and are not for transporting content (e.g., files or media containing voice, video, etc.) between two wireless nodes (e.g., wireless nodes 101a and 101b). Instead, the messages generally contain pointers to the content or a small amount of data (e.g. presence or context information) to minimize the data traffic transported over the ad-hoc mesh network 109. Accordingly, the limited capacity of the communication channels associated with such messages, pose additional challenges to providing a publish/subscribe mechanism and to coordinating the exchange and/or sharing of information. For example, to address this problem, the wireless nodes 101a-101n may then access the content using other communication channels (e.g., via IP through the communication network 103). In addition, the system 100 eliminates the problems associated with traditional methods for route establishment and maintenance (e.g., connection based communication protocols), such as maintaining and handing off connections as mobile devices move, and requiring high levels of network resources for maintaining connections in an environment with a high number or density of mobile devices. For example, the event of a wireless node 101 appearing/disappearing to/from the network does not generate any control signaling in the ad-hoc mesh network 109. Similarly, the system 100 creates routing information only when needed to route replies to queries back to the querying node. The routing information is generated by using the query messages alone (e.g., no control signaling is used for creating routing information). After the query and subsequent reply process is completed, the routes are forgotten. In other words, the query/reply process of system 100 provisions routes for a reply to provide awareness information on demand rather than pushing awareness information from one node 101 to another. In exemplary embodiments, both push (e.g., information is published over the ad-hoc mesh network 109) and pull (e.g., information is queried from other nodes 101a-101n of the ad-hoc mesh network 109) modes of disseminating awareness information are possible. In certain embodiments, it is contemplated that the pull mode of operation can be used instead of the push mode to help suppress potential spam messages.

Moreover, the system 100 optimizes the power consumption of wireless nodes 101 communicating over the ad-hoc mesh network 109 to enable always-on operation without seriously affecting the battery life of the wireless nodes 101. For instance, by utilizing only short awareness messages, by eliminating the need for any route maintenance signaling, by employing procedures to minimize transmission and reception of duplicative messages and by enabling an efficient sleep scheme for the short-range device-to-device radio used within each wireless node 101 (allowed by the low latency requirements typical of an awareness information network), the system 100 can potentially provide hundreds of hours (e.g., over 400 hours) of continuous operation of each wireless node 101 between battery charges in a mobile device. In one embodiment, the optimization procedures also extend to minimizing the transmission and reception messages include the processes for coordinating information request messages of the various embodiments described herein. The system 100 could be seen as a "nervous system" between the mobile devices, where small messages ("nerve impulses") are continuously exchanged by the mobile devices ("neurons") in order to bring awareness to the user of a mobile device about the user's surroundings.

The system 100 also enables the development of new services and applications based on awareness information (e.g., social networking applications, location-based applications, application for determining presence, applications for determining context, advertising applications). In particular, the continuous and immediate nature of the awareness information with respect to local environment enables compelling new services. For instance, awareness information may be combined with the increasingly available storage and computing power in mobile devices (e.g., wireless nodes 101a-101n) to create a local semantic web, whereby local awareness information is created and searched for automatically by wireless nodes 101 within the ad-hoc mesh network 109. As used herein, the term "semantic web" refers to a system in which the information and messages shared with the system is understandable by the nodes 101 within the system. It is noted that establishing such a local semantic web using the system 100 overcomes two major problems blocking the development of a global semantic web: (1) lack of mechanism for providing semantic content on a large scale, and (2) lack of semantically aware search engines to help users find information in a semantic web. The system 100 can also be used for collaborative context calculation, generation of collaborative recommendations based on user profile data of participating nodes 101, publishing pointers to information or content, searching for friends within a defined community, finding out what is going on and what kind of people are around a user, making the environment aware of the user, and other like applications.

To facilitate the creation of the semantic webs and/or for sharing information in general over the ad-hoc mesh network 109, the system 100 introduces the capability to provide a publish/subscribe mechanism including a publish/subscribe interface to applications using distributed valuespaces, efficient query/response mechanisms, and broadcast messages. More specifically, wireless nodes 101a-101n that are participating in the publish/subscribe mechanism have their own respective valuespaces for storing locally published information items and subscribed information items received over the ad-hoc mesh network 109. In one embodiment, there is no explicit synchronization between different wireless nodes 101a-101n, thereby advantageously avoiding the need to implement potentially complex synchronization protocols over the ad-hoc mesh network 109. As a result, the same application executing in different wireless nodes 101a-101n might have different sets of information available to it (e.g., in wireless node 101a, the application knows data items 1 and 2, but in wireless node 101n, the same application knows data items 2, 3, and 4.

In one embodiment, in lieu of a traditional synchronization process, the system 100 enables the applications executing in the wireless nodes 101a-101n to define their own data schema within their respective valuespaces. In one embodiment, the data schema defines the type and format of information that the associated application can send (e.g., publish) and receive (e.g., subscribe) within the valuespace.

Moreover, it is contemplated that an application can define and use multiple data schemas or have multiple instances of the one data schema. For example, to publish information, an application initiates, determines, and/or stores at least one data schema associated with the information along with the information in the valuespace of the corresponding wireless node 101a. Placing the data schema and information in the valuespace, makes the information available to other subscribing wireless nodes 101b-101n. In one embodiment, an application executing on one or more of the subscribing nodes 101b-101n can initiate a query based on any corresponding subscriptions. By way of example, in one embodiment, a subscription from an application is implicitly turned into a query message. The query is then periodically spread to other wireless nodes 101a-101n in the ad-hoc mesh network 109 according to, for instance, the message transmission and relay processes described below.

Upon receiving the query message, a receiving wireless node 101b performs a search of the local valuespace for matching or substantially matching data schemas. If there are published information items based on the same or similar schema, the results are returned as a response message. Upon reception of response messages at the subscribing node 101a, the results are inserted into the local valuespace and the subscribing applications are notified accordingly. In one embodiment, the subscribing applications can also define filters so that only selected information items are queried and received.

In some embodiments, by default, all messages are broadcasted so a wireless node 101a can receive responses to queries which it has not sent. Based on the knowledge that the wireless node 101a receives response messages even though it has not sent a query, the wireless node 101a can delay sending of its own queries (e.g., queries for the same or similar information contained in the received response messages) because it already has up-to-date information. In this way, the process can advantageously reduce potential traffic over the ad-hoc mesh network 109.

In another embodiment, wireless nodes 101a-101n that receive one or more of the responses messages may store the responses in their respective valuespaces even when the nodes 101a-101n have not sent a corresponding query. In this way, the wireless nodes 101a-101n can have a store of information in the valuespace that may be responsive to future queries. In one embodiment, these responses messages may be removed from the valuespace based on available memory in the valuespace, time, expiration period associated with respective messages, and the like.

However, in some cases, extensive use of the publish/subscribe mechanism or other forms of information sharing over the ad-hoc mesh network 109 can lead to a proliferation of information request messages. These information request messages can potentially burden the resource (e.g., processing and transmission resources). Accordingly, service providers and device manufacturers face significant technical challenges to enable efficient delivery of information and related information request messages between applications and nodes of the ad-hoc mesh network 109 while minimizing use of network resources and capabilities. To address this problem, the system 100 introduces the capability to designate a specific entity (e.g., a query engine as described with respect to FIG. 10 below) in participating wireless nodes 101a-101n that coordinate information request messages and information delivery between applications in different wireless nodes 101a-110n.

In one embodiment, the system 100 (e.g., via the query engine) makes decisions concerning a time to trigger or transmit information request messages (e.g., messages that seek and/or provide information) in order to meet the information demands of applications and nodes while minimizing network usage and traffic. By way of example, the system 100 makes message delivery or triggering decisions based, at least in part, on network or node context information provided over the ad-hoc mesh network 109. Generally, such context information (e.g., network traffic, network topology, node sensor information, published information, exchanged messages, etc.) is collected as side-effect of data traffic as discussed below. In yet another embodiment, the system 100 can further reduce or minimize network usage by combining one or more information request messages into a common message for transmission, determining an appropriate form of transmission of them messages (e.g., broadcast or unicast message), and the like.

The following are exemplary use-case scenarios for applications can exchange information over the ad-hoc mesh network 109 using various embodiments of the publish/subscribe mechanism described herein.

In one use-case, an application may subscribe to user profile data publishing by neighboring wireless nodes 101a-101n. By way of example, the user profile data may include information such as usage history, user behavior, user preferences, and the like. The application can then use the published user profile data to generate recommendations (e.g., recommendations for content, applications, services, items, etc.) based on local preferences. In one embodiment, the published user profile data may be limited to a community or group of wireless nodes 101a-101n according to the community processes discussed below. In some cases, the user profile data may be encrypted so that only group or community members may access the information even if the information is received and relayed by non-community members.

In another use-case, the awareness information alerts a user to nearby people or places. For example, a user is visiting a new town when the wireless node 101a alerts the user that "Salvatore, a friend of your friend David is nearby." The user may then arrange to meet Salvatore to get a recommendation for sites to visit in the new town. In another example, a user is looking for a good restaurant in an unfamiliar neighborhood. An application based on awareness information may present a list of local restaurants ranked by the number of people currently eating in the restaurant that have the same food preferences as the user. Such a list can be collected based on queries and replies that contain anonymous information of people's food preferences.

In another use-case, an application uses the awareness information to discover events near the user. For example, as a user passes a park, the wireless node 101a informs the user, based on messages exchanged between nearby devices, that "There is a Japanese culture festival in the Tea Garden Park; five members of your Kabuki community are there: Zen, Mi, Xia, Talo, and Chris." The user may then decide to attend the festival.

In another use-case, an application provides location-based or context-based services using awareness information. For example, a wireless node 101a does not have positioning capabilities but nonetheless knows that it is in a grocery store based on anonymous awareness information from other nearby wireless nodes 101. It is contemplated that the grocery store may also place a node 101 in the store to provide such context information, possibly combined with other store specific information such as the address of the store's web page. The wireless node 101a then reminds the user to "Remember to buy dishwasher detergent" based on the user's location in a grocery store. The awareness information can also be the physical position information from a neighboring wireless node 101 that has the positioning capability. Sharing of positioning information with a neighboring node with such a capability can enable nodes 101 without such capability to offer navigational services.

In another example, a group of people are attending a meeting. The meeting invitation includes an identification code for that particular meeting that is stored in the mobile nodes 101 of the meeting attendees (e.g., the identification code may be stored in the calendar data). Using the principles set forth in this invention, the nodes 101 can exchange the meeting identification code over the ad-hoc mesh network 109 while attending the meeting. Comparing the exchanged identification code in a user's wireless device 101 can, for instance, establish whether the users was indeed at the meeting corresponding to the identification code. Such accurate social context knowledge can be used, for instance, to adapt the service or application behavior towards the user.

In another use-case, an application provides for search of local information that changes rapidly and very specific to a local environment. The local information often does not reach traditional Internet search engines. For example, a user bought tickets to a concert, but discovers at the last minute that the user cannot attend. The user stores a string "Ticket to concert X at venue Y is available" into the awareness services module 111 of the user's wireless node 101. As a result, a nearby wireless node 101a, within a few street blocks away, that searches for tickets by sending query messages with a string "Ticket concert X" over the multi-hop ad-hoc mesh network 109, will receive the user's ticket availability message as an automatic reply.

In another use-case, an application enables locally targeted advertising. For example, it is almost closing time for a local fresh fruit market. The merchants decide to publish an advertisement over the ad-hoc mesh network 109 that "Apples are 50% off for the rest of the day." The advertisement is available to users who live nearby the market. In another example, a user browses an advertisement for a new printer on a wireless node 101a. In the browsing activity, a code attached to the advertisement is stored in the awareness services module 111. Upon searching and finding such a code, a nearby electronics store sends the user an offer to sell the printer with a 10% discount.

In another use-case, an application automatically creates an activity log based on the awareness information associated with a user. For example, the application records the people the user meets along with other awareness information such as when, where, context, etc. The user then meets a person while walking on the street. The person looks familiar but the user does not recall the person's name or how the user knows the person. The wireless node 101a running the application reports that the person's name is David and that the user met him at a soccer match one year ago in London.

In another use-case, an application provides the capability to initiate local discussion threads and group chats over the ad-hoc mesh network 109. For example, the supporters of a football team form a community over the ad-hoc mesh network 109 wherein community members can send short text messages (e.g., of small enough size to be sent directly over the ad-hoc mesh network 109) that can be received and read only by the fan club community members of that particular team.

Figure 2A:
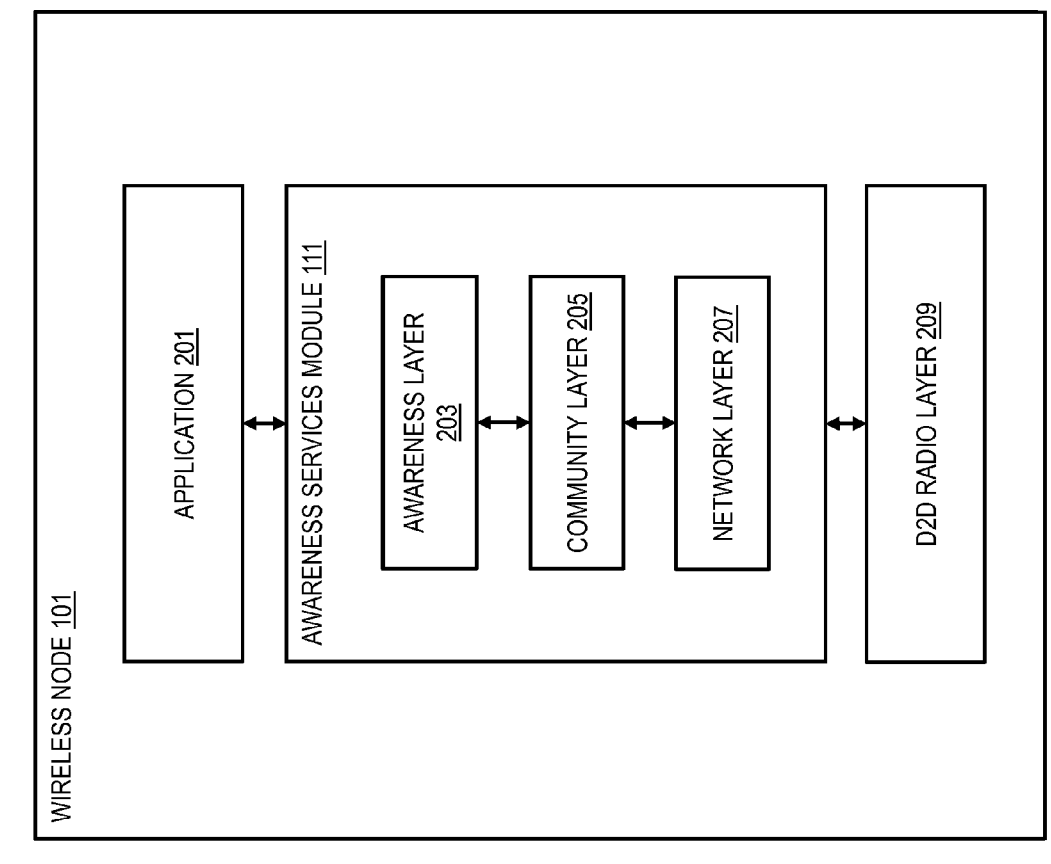
FIG. 2A is a diagram of the components of a wireless node including an awareness services module, according to an exemplary embodiment.

FIG. 2A is a diagram of the components of a wireless node including an awareness services module, according to an exemplary embodiment. FIG. 2A is described with respect to FIGS. 2B-2E which are diagrams of the components of an awareness services module, according to various exemplary embodiments. As shown in FIG. 2A, a wireless node 101 includes one or more components for sharing awareness information within the ad-hoc mesh network 109. It is contemplated that the functions of these components may be combined in one or more components or performed by other components of equivalent functionality. In this embodiment, the wireless node 101 includes an application 201 that uses awareness information to provide various services and functions including social networking, location-based services, presence information, context determination, advertising functions, etc. The application 201 may interact with the awareness services module 111 to obtain or share awareness information. In one embodiment, the interaction is via various embodiments of the publish/subscribe mechanism described herein subject to the process for coordinating information request messages as described with respect to various embodiments of the system 100 (e.g., see description of the coordination process described with respect to FIGS. 10-13 below).

Figure 2B:
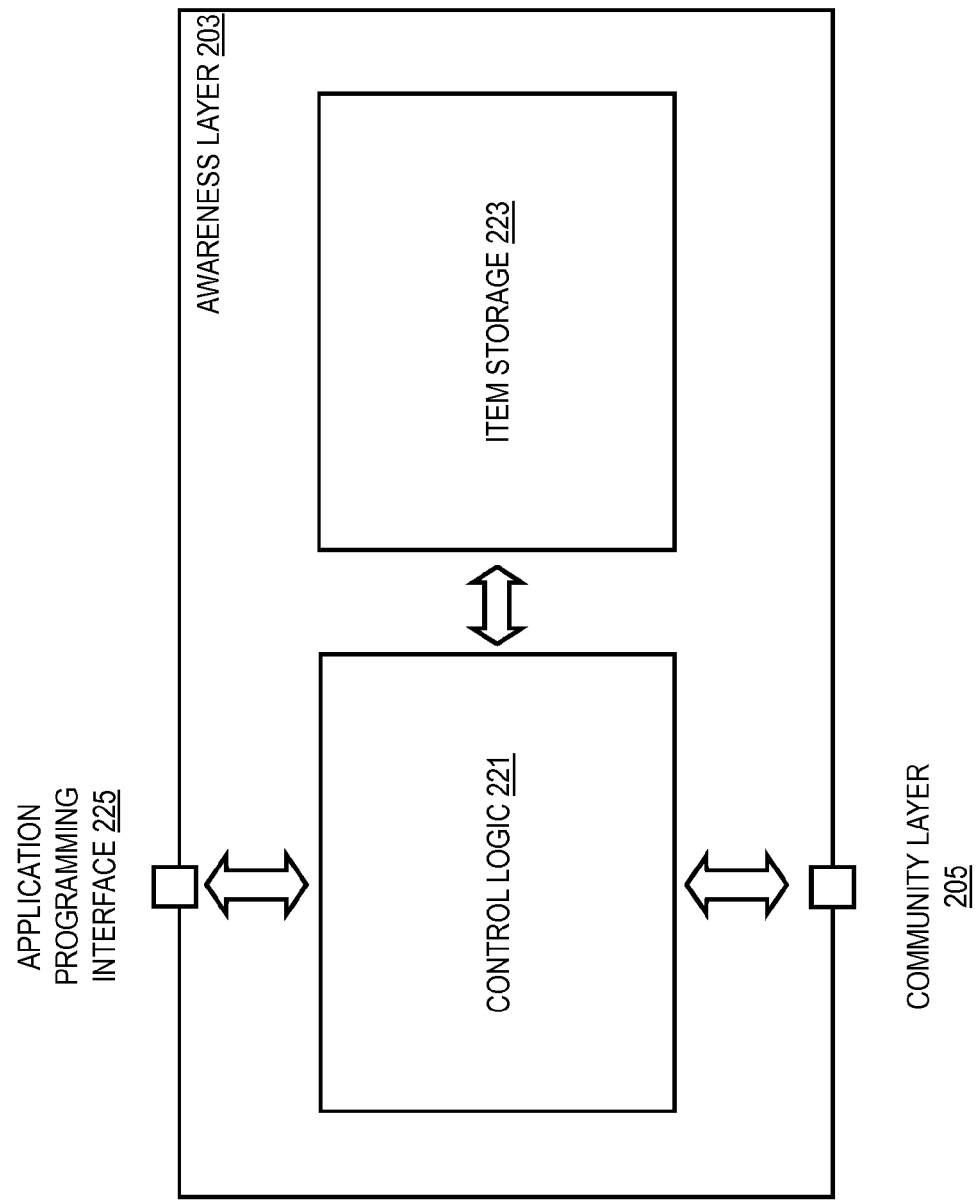
FIGS. 2B-2E are diagrams of the components of an awareness services module, according to various exemplary embodiments.

By way of example, the awareness services module 111 includes three layers: a awareness layer 203, a community layer 205, and a network layer 207. The awareness layer 203 is the highest control layer for sharing awareness information. As shown in FIG. 2B, the awareness layer 203 includes a control logic 221 and item storage 223. The control logic 221, for instance, provides the logic for creating, publishing, subscribing to, querying, and/or receiving awareness information over the ad-hoc mesh network 109. The control logic 221 can store the information that it either creates or receives in the item storage 223. In one embodiment, the item storage 223 represents, at least in part, the valuespace for storing published and subscribed information items. It is contemplated that the item storage 223 may be of sufficient size to store all or a portion of the information that flows through the wireless node 101 over a configurable period of time (e.g., days, months, or years).

In exemplary embodiments, the control logic 221 enables querying and dissemination of awareness information by initiating the flooding of the query or information to neighboring wireless nodes 101 within the ad-hoc mesh network 109. For example, upon receiving a query, the wireless nodes 101 in the local neighborhood that have the queried information may decide to reply to the querying node automatically. By way of example, a reply message can be sent as a unicast message to the querying node, or as a broadcast message to all nodes 101. Thus the replying node can control how information is delivered among the nodes 101 in the network 109. Also the replying node can estimate whether all the possibly interested nodes 101 in the network 109 have had the opportunity to previously receive the reply and thus omit transmitting a reply message accordingly. In exemplary embodiments, the reply information is also automatically stored in the item storage 223 of each wireless node 101 through which the propagating reply passes. Moreover, the reply to a query may result in return of a pointer to specific content relevant to the query rather than the content itself under certain circumstances (e.g., when the specific content is large in size). It is contemplated that the reply may contain direct content if the content is relatively small (e.g., a few tens of bytes of information). By using a pointer, the system 100 minimizes the data traffic that flows through the ad-hoc mesh network 109. The user may then access the content via the pointer (e.g., a universal resource locator (URL) address, IP address) via a more appropriate communication protocol (e.g., IP) and/or means of communication (e.g. infrastructure networks). The receipt of the pointer (e.g., IP address) may automatically trigger the transfer of the content using, for instance, the communication protocol associated with the pointer. In the case of broadcasting or publishing information, any wireless node 101 through which the published information propagates may store the information in item storage 223 or valuespace of the wireless node 101.

In other exemplary embodiments, awareness information can also be published directly by flooding an awareness message. Such a push mode for the dissemination of awareness information can be used to support some applications (e.g. advertising or group chatting) over the ad-hoc mesh network 109.

It is recognized that privacy and anonymity may be of concern to users of the system 100. Accordingly, the control logic 221 provides mechanisms for ensuring privacy and anonymity. For example, the control logic 221 can prevent the transmission of intimate information when the number of neighboring wireless nodes is small to prevent the possibility of inferring identity. As used herein, the term "intimate information" refers to information directly related to the user, e.g., the user's habits, tastes, or preferences (musical preferences, favorite restaurants, etc.). In one embodiment, the intimate information (e.g., comprising user profile data) may be transmitted using encryption so that only authorized nodes 101a are able to access in the information.

The control logic 221, together in co-operation with the community layer 205, may also periodically broadcast decoy queries and replies to make tracking an individual wireless node 101 more difficult. Since an outside observer does not know the authentication key associated with a community, the observer cannot distinguish a valid message from a fictitious one. Accordingly, by observing decoy messages, the observer is likely to detect presence of a private community when there is not one. Additionally, the control logic 221 enables to user to define filters for incoming information (e.g., filter advertisements) and how these filters would work (e.g., ignore the information completely, relay the information but do not store, etc.). It is also contemplated that the user can direct the control logic 221 to interact with the community layer 205 to control the user's visibility on the ad-hoc mesh network 109 (e.g., no visibility, visible only to a certain community or other user) to maintain privacy. As another mechanism for protecting privacy, the control logic 221 can interact with the community layer 205 to anonymize a specific message and corresponding identifiers as described below with respect to the community layer 205.

Because one of the goals of the system 100 is to provide a mechanism for anonymous spreading of awareness information, it is recognized that undesired or unsolicited messages (e.g., spam messages) may become a problem. To address this problem, the control logic 221 may obtain, for instance, information from the lower system layers of the awareness services module 111 about the traffic load and current average power consumption. If the traffic load is medium or high (meaning that also power consumption related to system 100 is medium or high) restrictions may be set for the frequency at which flooding messages are sent by the control logic 221. It is also contemplated, that the neighboring peer nodes 101 can be configured to not forward any flooding messages originating from a node 101 neglecting such message restrictions.

The awareness layer 203, together with the community layer 205, provide an application programming interface (API) 225 to enable an application 201 to access the functions of the control logic 221 and the item storage 223. In exemplary embodiments, the API 225 enables application developers to have uniform and easy access to functions related to sharing awareness information over the ad-hoc mesh network 109. It is contemplated that the API 225 is extensible to accommodate any application designed to access or use awareness information. The applications in the various nodes 101 do not have to be the same or mutually compatible. It is sufficient that the applications use the API correctly to be able to publish and search awareness information in the surrounding nodes 101 and the applications share the same or matching data schema.

The awareness layer 203 also has connectivity to the community layer 205. The community layer 205 controls the formation and cataloging of communities of wireless nodes 101 within the ad-hoc mesh network 109. By way of example, a user may create any number of communities for sharing awareness information. It is contemplated that a community may be either a peer community (e.g., any wireless node 101 may join), a personal community (e.g., a wireless node 101 may join only if invited), or the open local community that consists of all nodes in the local neighborhood. In one embodiment, one or more communities may be formed to for exchanging information using a publish/subscribe mechanism, wherein the publishers and subscribers are members of the community. In exemplary embodiments, the messages that traverse between the wireless nodes 101 within the ad-hoc mesh network 109 belong to one of these three community types. Communities can either be private (messages are encrypted) or public (no encryption used). In exemplary embodiments, membership and status in a community affect how the wireless node 101 shares awareness information (see the discussion with respect to FIG. 2G for additional details of community membership). For example, a private community may be created for sharing published user profile data that may include personal data.

Figure 2C:
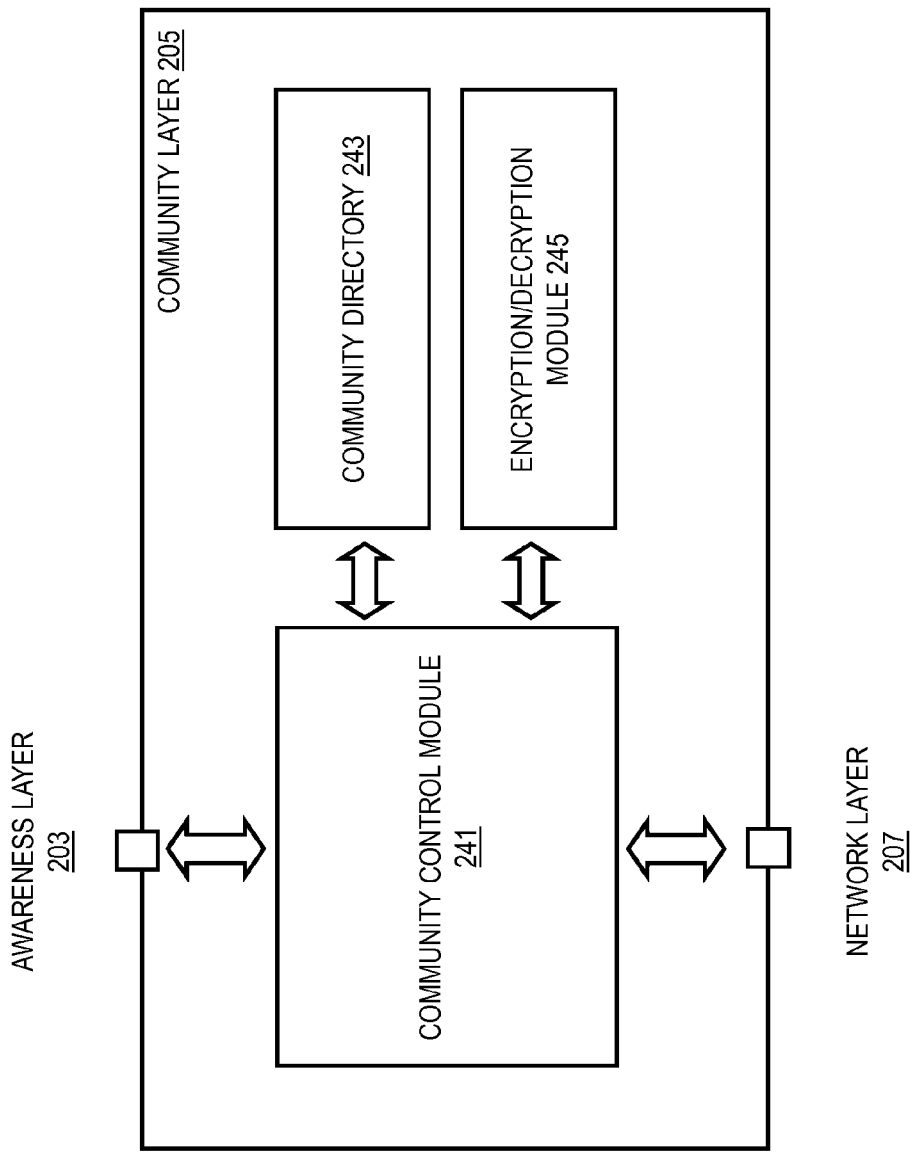

Furthermore, a community may be created for any purpose or duration (e.g., a permanent work community, a permanent community of friends, a temporary community of concert goers lasting only the duration of the concert). As shown in FIG. 2C, the community layer 205 includes a community control module 241, a community directory 243, and an encryption/decryption module 245. The community control module 241 provides the logic for creating, joining, managing (e.g., updating membership, configuring settings and preferences, setting privacy policies), and deleting communities. The module 241 also provides part of the API 225. In one embodiment, the community layer 205 provides information related to its management of communities and their respective members as context information coordinating information request messages over the ad-hoc mesh embodiments. For example, the context information provided may include information on when new nodes 101 join or leave one or more of the communities along with respective community settings and configuration.

In some embodiments, the community control module 241 assigns a unique community identification number (CID) to each community for use within the ad-hoc mesh network 109. The control module 241 can also generate authentication keys K associated with the CID to, for instance, authenticate users who wish to join the community or authenticate messages directed to the community. For example, a wireless node 101 may invite another wireless node 101 to join a community by transferring the CID and authentication keys associated with the community to the other wireless node 101. It is contemplated that the transfer of the CID and corresponding authentication key may occur using short range radio or using another secure mechanism (e.g., short message service (SMS) or electronic mail). It is noted that both peer and personal communities use a CID and corresponding K, whereas the open local community either can use a predetermined value for CID (e.g., zero) or does not use the CID at all.

To ensure privacy (as discussed above), the community control module 241 interacts an encryption/decryption module 245 to anonymize the CID when including the CID in messages over the ad hoc mesh network 109. For example, a wireless node 101 may direct a query to a specific community using an anonymized CID (e.g., a pseudonym) associated with the community in lieu of the actual CID. In exemplary embodiments, multiple anonymized CIDs may be used to represent a single community. In this way, it is more difficult to identify queries corresponding to a particular community by monitoring traffic within the ad hoc mesh network 109. From the perspective of an outside observer, the anonymized CIDs look random. In addition, the encryption/decryption module 245 may encrypt or decrypt message data using, for instance, a temporary key that is periodically derived from the authentication key K associated with the CID. These measures hinder the discovery of the CID by outsiders that do not have the authentication key. By way of example, the community layer 205 inserts a special header into the messages that it receives from the awareness layer 203. The special header, for instance, contains a list of anonymized community identifiers corresponding to the communities to which the message is relevant.

Figure 2D:
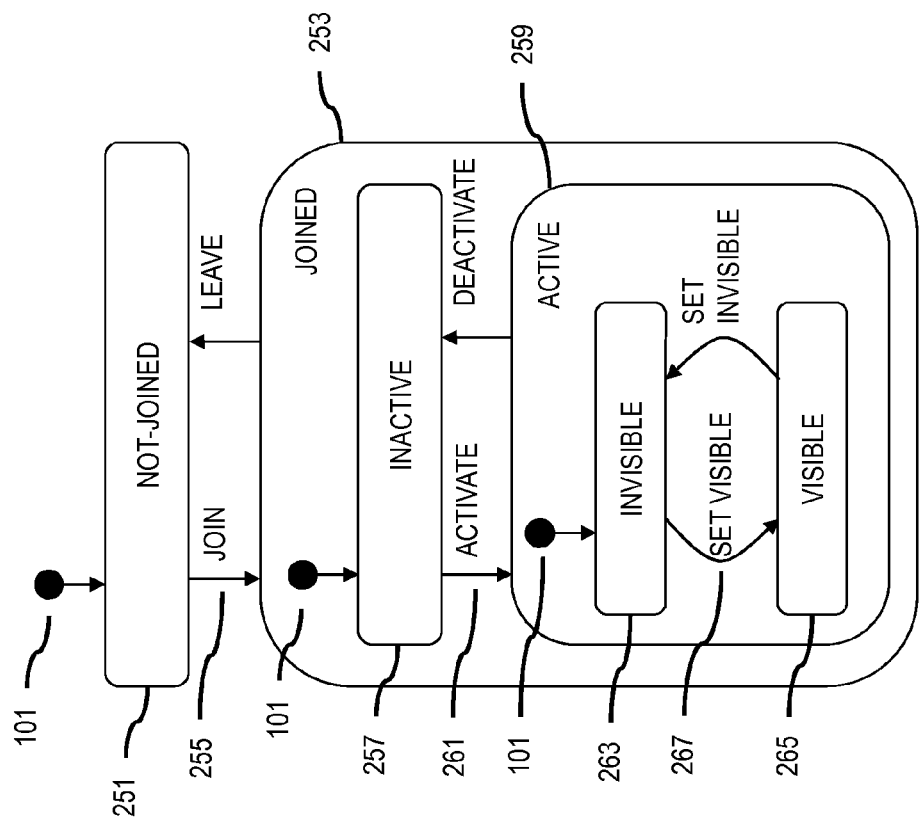

FIG. 2D is a state diagram of the effect of community membership and status on sharing awareness information, according to an exemplary embodiment. As shown in FIG. 2D, a wireless node 101 may be in either one or two states (e.g., a not-joined state 251 and a joined state 253) with respect to membership in a community within the ad-hoc mesh network 109. The application 201 of wireless node 101 issues, for instance, a command 255 to either join or leave a community to transition between the not-joined state 251 and the joined state 253. When the wireless node 101 is in the not-joined state 251 with respect to a community, the wireless node 101 has no information (e.g., CID and associated authentication keys K) about the community and cannot access messages directed to the community. When the wireless node 101 is in the joined state 253, the community layer 205 receives the CID and possibly one or more authentication keys associated with the community. In one embodiment, authentication keys are provided when membership in the community is by invitation or otherwise restricted (e.g., when the community is a personal community or a private community). Accordingly, the community layer 205 will be able to encrypt outgoing community specific messages and to decrypt incoming community specific messages. As noted previously, community membership may also be based, at least in part, on a publish or subscription status to information shared over the ad-hoc mesh network 109.

When the wireless node 101 is in the joined state 253, the wireless node 101 may also be in either an inactive state 257 or an active state 259. To transition between the inactive state 257 and the active state 259, the application 201 may issue a command 261 to either activate or deactivate the joined state 253 via the application programming interface 225. When the wireless node 101 is in the inactive state 257, the community layer 205 abandons the message even though it is a member of the community. In certain embodiments, the wireless node 101 may also be invisible to other members of the community while in the inactive state 257. For example, the wireless node 101 may enter the inactive state 257 when it temporarily does not want to receive or share information with the community. When the wireless node 101 is in the active state 259, the community layer 205 encrypts and decrypts community messages as usual for private communities, and enables all outgoing and incoming community specific messages for public communities (e.g., communities with no restrictions on membership).

Within the active state 259, the wireless node 101 may also be in either an invisible state 263 or a visible state 265. To transition between the invisible state 263 and the visible state 265, the application 201 issues a command 267 to set either the visible or invisible state. When in the invisible state 263, the community-specific identity (e.g., a user alias) associated with the wireless node 101 cannot be queried by other members of the community. For example, in the invisible state 263, the community layer 205 continues to receive and send community messages without its identity known to other community members. When in the visible state 265, the identity of the wireless node 101 can be queried by other members of the community.

In various embodiments, the community directory 243 of the community layer 205 maintains, for instance, information on the communities that the user has joined. Such information contains, at least, the community identification (CID). Additionally, it may contain public and/or private authentication keys (K) of the joined communities and a list of anonymized community identifiers for each community. The community control module 241 may periodically recalculate the list of anonymized CIDs. By way of example, the community layer 205 inserts a header into the message it receives from the awareness layer 203. The header contains, for instance, a list of anonymized community identifiers identifying the communities to which the message is relevant.

It is contemplated that a special personal community can be reserved for tracking new bonds or relationships created between users. Consider, for example, that user A meets user B for the first time and wants to create a radio bond between the mobile devices corresponding to each user. In one embodiment, user A can initiate the creation this bond with user B by transferring to user B (e.g., by using a secure transfer mechanism) the CID and the public K of user A's personal "new bonds" community. Similarly, user B may give user A similar credentials corresponding to user B's "new bonds" community Once the credentials are exchanged and the bond has been created, user A may find user B over the ad-hoc mesh network 109 by searching for members of user A's "new bonds" community. In other words, with a simple search of a single community, user A can search for all the people in user A's local neighborhood with whom user A has created a bond. This requires that a high number of community CIDs and Ks can be stored in the community directory 243. Also, an effective lookup of the community directory must be provided. There are many existing and good solutions for such efficient lookup.

As the user creates new bonds, the number community CIDs and Ks stored in the user's community directory 243 can grow quite large. Accordingly, to enable effective search of a large number of communities, the community layer 205 may generate a special community search message to initiate the search. For example, the special community search message contains, at least in part, a list of anonymized community identifiers corresponding to the communities to be searched. To protect the privacy, the community layer 205 can generate a new set of anonymized community identifiers for each community search message. If the community layer 205 finds a match to any of the anonymized community identifiers in any of the neighboring nodes 101 that receives the search message, the community layer 205 generates a reply message that may contain the alias of the user in that community or other community specific information. The reply message may be encrypted with the encryption key of the community. In one embodiment, the community search message may relate to queries and responses transmitted over the ad-hoc mesh network 109 in support of various embodiments of the publish/subscribe mechanism described herein.

Figure 2E:
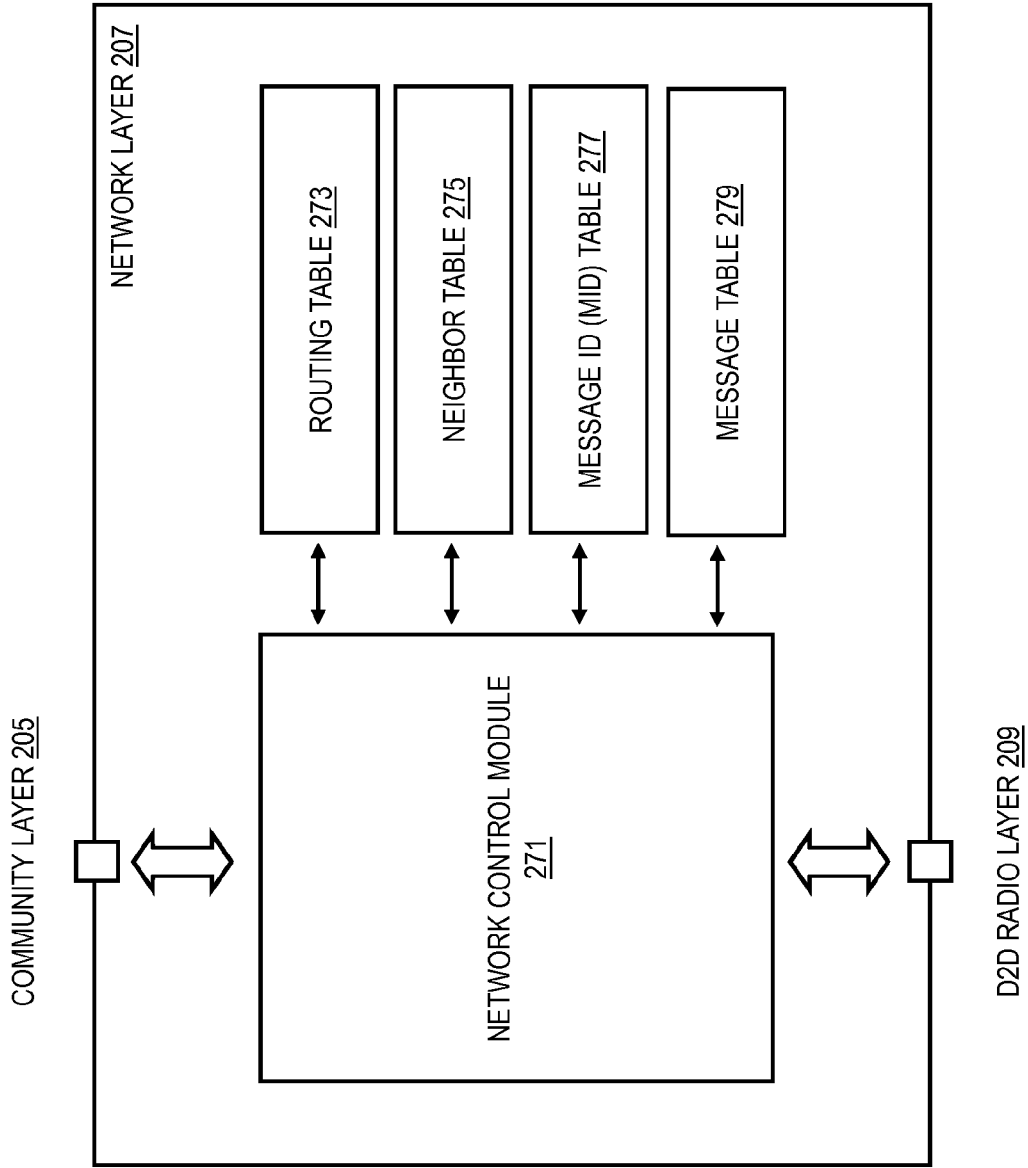

As shown in FIG. 2C, the community layer 205 has connectivity to the awareness layer 203 above and the network layer 207 below. The network layer 207 manages the rebroadcasting of received flooding messages and the routing of the unicast (typically reply) messages received by the wireless node 101. FIG. 2E depicts a diagram of the components of the network layer 207, according to an exemplary embodiment. The network layer 207 includes a network control module 271, routing table 273, neighbor table 275, message identification (MID) table 277, and message table 279. The network control module 271 directs the broadcasts of messages and information by managing and updating the routing table 273, neighbor table 275, MID table 277, and message table 279. In certain embodiments, the network control module 271 may also assist in protecting the privacy and anonymity of users by periodically changing the network layer identification associated with the wireless node 101. It is noted that making such a change in the network layer identification between queries does not cause routing problems for replies because the routing information is recreated by each query in the ad-hoc mesh network 109. In one embodiment, the network layer 207 provides context information, for instance, related to network topology, network traffic, exchanged messages, published information, etc. (e.g., the routing table 273, neighbor table 275, the MID table 277, the message table 179, etc.) to support coordination of information request messages as described below with respect to FIGS. 10-13.

In exemplary embodiments, the network layer 207 may insert a header into messages it receives from the community layer 205 to, for instance, direct flooding and routing of the received messages. The structure of this network layer message header 281 is discussed with respect to FIG. 2F. FIG. 2F is a diagram of the data structure of a network layer message header, according to an exemplary embodiment. As shown, the message header 281 contains the following fields: (1) a TX field 282 to identify the transmitter node ID (NID) of the last transmitting node 101; (2) a SRC field 283 to identify the source node ID of the node 101 that originated the message; (3) a DST field 284 to identify the destination source ID of the intended recipient of a unicast (reply) message (e.g., this field is give a value of zero when the message is a flooding messages); (4) a MSN field 285 to identify the message sequence number assigned by the source node; (5) a hop count field 286 that is incremented by one by each node 101 that transmits the message and (6) a hop limit field 290 that is decremented by one by each node 101 that transmits the message If the hop limit field 290 drops to zero then the a node 101 does not retransmit the message. In certain embodiments, the message header 281 may also contain the following optional fields: (7) a geographical limit field 287 to designate the extent of the physical over which the message is intended to propagate (e.g., the geographical limit field 287 may contain a geographical position of the source node and a maximum flooding radius from that position); (8) a temporal limit field 288 (e.g., the temporal limit field 288 may contain the time when the message becomes obsolete and should be dropped); and (9) a context limit field 289 that defines the context beyond which the message is not intended to propagate (e.g. a message related to a particular concert is not intended to extend beyond the concert venue).

Returning to FIG. 2E, the network layer 207 also contains a routing table 273. In exemplary embodiments, the routing table 273 contains a listing of the node identification number (NID) of the originating wireless node 101 (e.g., source NID) and the NIDs of the last known transmitters of the message. The purpose of the routing table is to enable the routing of the reply messages (e.g., unicast messages) back to the querying node that originated the query through a flooding message. As the message propagates through the ad-hoc mesh network 109, each subsequent wireless node 101 that receives the message adds the NID of the last transmitter to the routing table to record the next hop neighbor towards the source node. The source node is marked as the destination node (DST) in the routing table. The update of the routing table 273 is coordinated by the network control module 271. As shown in Table 1, the routing table 273 lists the destination NID, the transmitter NIDs associated with wireless nodes 101 that have rebroadcasted a message. The network control module 271 may also add additional information to the routing table like the time when the destination node was detected to be active, the number of hops to the destination via a specific transmitter node. The network control module 271 may use this information as additional parameters when it determines the best route to the destination node.

TABLE 1

| Destination NID | Transmitter NIDs |
| --- | --- |
| $DST_1$ | $TX_{11}, TX_{12}, \ldots, TX_{1M}$ |
| $DST_2$ | $TX_{21}, TX_{22}, \ldots, TX_{2N}$ |
| ... | ... |
| $DST_S$ | $TX_{S1}, TX_S, \ldots, TX_{ST}$ |

The neighbor table 275 contains a list of the neighboring wireless nodes 101 and an estimate of their relative radio distance (see Table 3). It is contemplated that the observed signal strength together with the known transmitting power of a neighboring wireless node 101 is an indicator of the proximity of the wireless node 101 and can be used to calculate the relative radio distance. The relative radio distance of the node from which the message was last received is then used as a criterion for whether or not the wireless node 101 retransmits a received message. For instance, a higher signal strength indicates closer proximity to the wireless node 101. The network control module 271 monitors the signal strengths of neighboring nodes 101 as the module 271 receives messages from nearby devices and uses it to estimate the relative radio distance (e.g., proximity of the transmitting node 101). It is also contemplated that the network control module 271 may use any other mechanism for estimating the relative radio distance of neighboring nodes (e.g., estimating location using global positioning satellite receivers or other positioning techniques).

In certain embodiments, the network control module 271 uses the proximity information to direct the routing and transmission of messages over the ad-hoc mesh network 109. For example, the system 101 can reduce the potential for overloading the ad-hoc mesh network 109 by implementing a smart flooding scheme whereby only a few nodes 101 retransmit a flooding message. Whether a node 101 retransmits a flooding message can be dependent on the relative distance group (e.g., "very near", "near", or "far") to which the node 101 that is the transmitter of the message belongs. More specifically, if the transmitting node 101 is in the "far" or "near" group, the receiving node 101 can retransmit the flooding message. If the transmitting node 101 is in the "very near" group, the receiving node 101 does not retransmit the flooding message. For each broadcast message received from a node in either the "far" or "near" group, the network control module 271 assigns a random delay time for relaying or rebroadcasting. The delay period, for instance, exhibits a distribution function based on the estimated relative radio distance as a way to randomize the delay period before transmission. The distribution should be chosen in such a way that the random delay is larger for those nodes that are "near" than for those that are "far." This favors, for instance, nodes 101 that are further away to relay the flooding message forward, which results in better flooding efficiency (smaller total number of transmissions). The use of a random delay time also prevents the unintended synchronization of message broadcasts as the message propagates over the ad-hoc mesh network 109. For example, unintended synchronization of the message broadcasts may result in too many nodes 101 sending broadcasting (i.e., flooding) messages over the ad-hoc mesh network 109 at exactly the same time. Additionally, the delay time provides an opportunity for the network control module 271 to monitor and count rebroadcasts of the message by other neighboring wireless nodes 101.

TABLE 2

| Transmitter NID | Relative Radio Distance |
| --- | --- |
| $TX_1$ | $D_1$ |
| $TX_2$ | $D_2$ |
| ... | ... |
| $TX_T$ | $D_T$ |

The MID table 277 contains a list of received messages. As the wireless node 101 receives messages from neighboring nodes over the ad hoc mesh network 109, the network control module 271 uses the MID table to check whether the message has been received previously by, for example, comparing the MIDs in the MID table 277 to that of the received message. The MID table 277 also contains a flag indicating whether a message has been or is being transmitted by the node 101 and the time when the entry was last updated. In exemplary embodiments, the MID is the tuple (SRC, MSN), where SRC is the NID of the source node and MSN is a message sequence number assigned by the source node. In this way, the MID is a unique identifier of each message that propagates in the network 109. The network control module 271 makes an entry in the MID table 277 for all new messages that it receives. If the message has been scheduled for transmission, the module 271 increments the message counter in the message table (see Table 4).

TABLE 3

| MID | Sent flag | Time of reception |
|---|---|---|
| (SRC$_1$, MSN$_{11}$) | "SENT" | t$_{11}$ |
| (SRC$_1$, MSN$_{12}$) | "NOT SENT" | t$_{12}$ |
| (SRC1, MSN13) | "SENDING" | t$_{13}$ |
| ... | ... | ... |
| (SRC$_2$, MSN$_{21}$) | "NOT SENT" | t$_{21}$ |

The message table 279 contains messages that the network control module 271 has scheduled to transmit. For example, as the node 101 receives a flooding message that the network control module 271 schedules for transmission, the module 271 updates the message table to include the message in the message table 279. Each entry in the message table 279 contains the message itself, the time when the message is scheduled to be sent, and the number of receptions of the same message by the node 101 (see Table 4). In exemplary embodiments, a message is not relayed over the ad-hoc mesh network 109 if the number of times the message has been received exceeds a predefined limit. For example, a message has the initial count of 0. In this example, as a wireless node 101 in the neighborhood is observed to transmit the message, the message count associated with the message is increased. When the maximum message count is reached, the network control module 271 removes the message from the message table 279. The transmitter of each message is also associated with an estimated relative radio distance (D) indicating whether the transmitting node is within close proximity of the wireless node 101 (e.g., transmitting node 101 is in the "very near" relative radio distance group) or far from the wireless node 101 (e.g., transmitting node 101 is in the "far" relative radio distance group). If the relative radio distance associated with the transmitting node indicates that the transmission of the message occurred "very near," the wireless node 101 would not have to relay the message because it is assumed, for instance, that most of the other neighboring wireless nodes 101 have already received the same message. By taking into account the relative radio distances of neighboring nodes, the described smart flooding functionality leads to, on average, each flooding message being received for a few times by each node 101 independent of the node density. The number of times a message is received by any one node 101 affects the scalability of the network 109.

If the received message, however, is a unicast reply message that was addressed to the receiving node 101, the network control module 271 checks whether the destination node 101 can be found in the routing table 273 (e.g., can be found from the destination field in the reply message, or obtained from the source field of the query by the replying node). If found, the routing table entry will give the NID of the neighboring node to which the reply message will be sent in the next opportunity. If the unicast transmission is not successful, the next entry for the same DST will be used as the next try. If the received message is a unicast reply message that was not addressed to the receiving node, and no acknowledgment from the intended receiver node was heard, the node will store the message in the message table 279 for scheduled retransmission. It is noted that unicast messages or acknowledgement messages that are not addressed to the node 101 are normally received D2D radio layer 209 (see discussion of the D2D radio layer 209 below) but not by the awareness services module 111. However, under certain circumstances, the D2D radio layer 209 can provide such messages to the awareness services module 111 to schedule for retransmission. For example, if no successful unicast or acknowledgement of the same message is observed by the time when the message is scheduled to be transmitted, the node 101 will transmit the unicast message to the intended recipient found from the routing table 273 associated with the message. In this way, the nodes 101 that are not the intended recipients of the reply messages can assist in routing the message forward towards the correct destination.

TABLE 4

| Message | Time to send | Received msg count |
|---|---|---|
| MSG$_1$ | t$_1$ | C$_1$ |
| MSG$_2$ | t$_2$ | C$_2$ |
| ... | ... | ... |
| MSG$_M$ | t$_M$ | C$_M$ |

As shown in FIG. 2A, the awareness services module 111 has connectivity to a device-to-device (D2D) radio layer 209. The D2D radio layer 209 enables the formation of the ad-hoc mesh network 109 and sharing of awareness information using, for instance, short range radio technologies such WLAN and Bluetooth®. It is contemplated that the D2D radio layer 209 may use any wireless technology for communication between devices over short ranges. The radio technology, for instance, enables each wireless node 101 within the ad-hoc mesh network 109 to broadcast messages in a connectionless way to the neighboring nodes 101 that are within radio range. As used herein, the term "connectionless" means the wireless nodes 101 need not use two-way signaling to establish a communication channel before broadcasting a message. In exemplary embodiments, the D2D radio layer 209 may include multiple radios using one or more different technologies or protocols (e.g., WLAN and Bluetooth® simultaneously). A wireless node 101 configured with multiple radios may act as a gateway node to span two or more sub-networks serviced by the different wireless technologies. In this way, messages broadcast on one sub-network may be propagated to another sub-network.

Figure 2G:
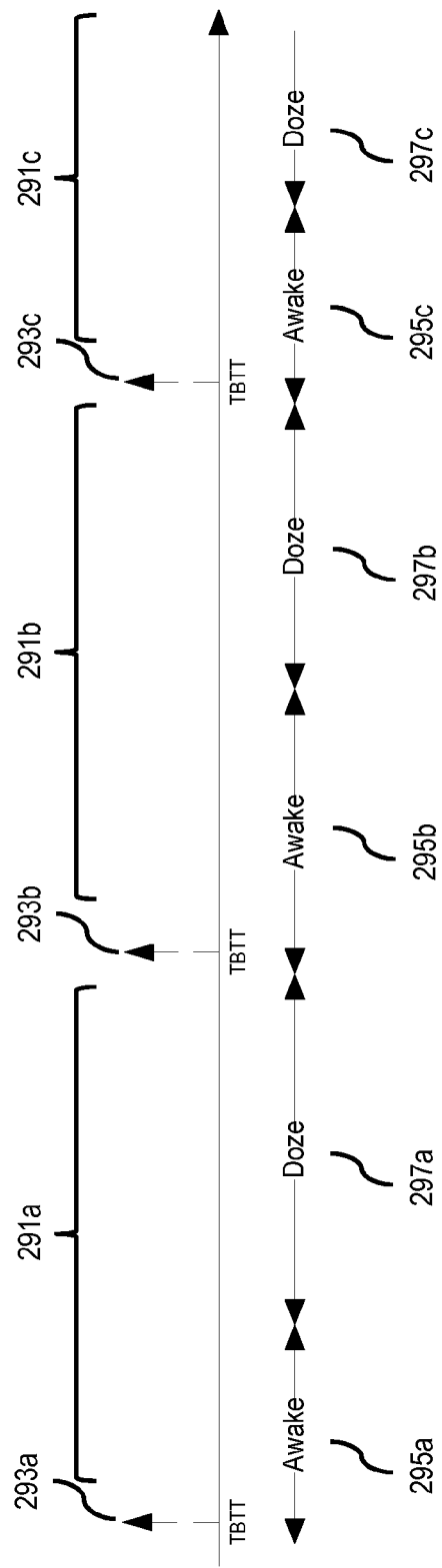
FIG. 2G is a diagram depicting a power saving scheme of a device-to-device radio layer, according to an exemplary embodiment.

FIG. 2G is a diagram depicting a power saving scheme of a device-to-device radio layer, according to an exemplary embodiment. The small amount of awareness data as well as the low latency requirements of the system 100 enables the operation of the D2D radio layer 209 in a way that leads to low power consumption. As shown in FIG. 2G, the D2D radio layer 209 may have beaconing periods 291a-291c delineated by target beacon transmission times (TBTTs) 293a-293c. In exemplary embodiments, the D2D radio layer 209 may operate in a time-synchronized manner and utilize only a fraction of the time for active communication (e.g., during awake periods 295a-295c). During the rest of each beaconing period 291, the D2D radio layer 209 is in, for instance, a power-saving or dozing mode (e.g., during doze periods 297*a*-297*c*). For example, each beaconing period 291 can be on the order of hundreds of milliseconds and each awake period 293 only a few milliseconds, leading to effective radio utilization of approximately one percent. It is contemplated that for situations, where the number of nodes 101 is very large (such as during mass events), time-wise radio utilization can increase up to 100 percent momentarily (e.g., awake period 293 equals active transmission period 291). At times of low traffic (for example at night), the radio utilization can be decreased to, for instance, 0.1 percent, by utilizing every tenth awake period 293 while still maintaining synchronization.

Figure 15:
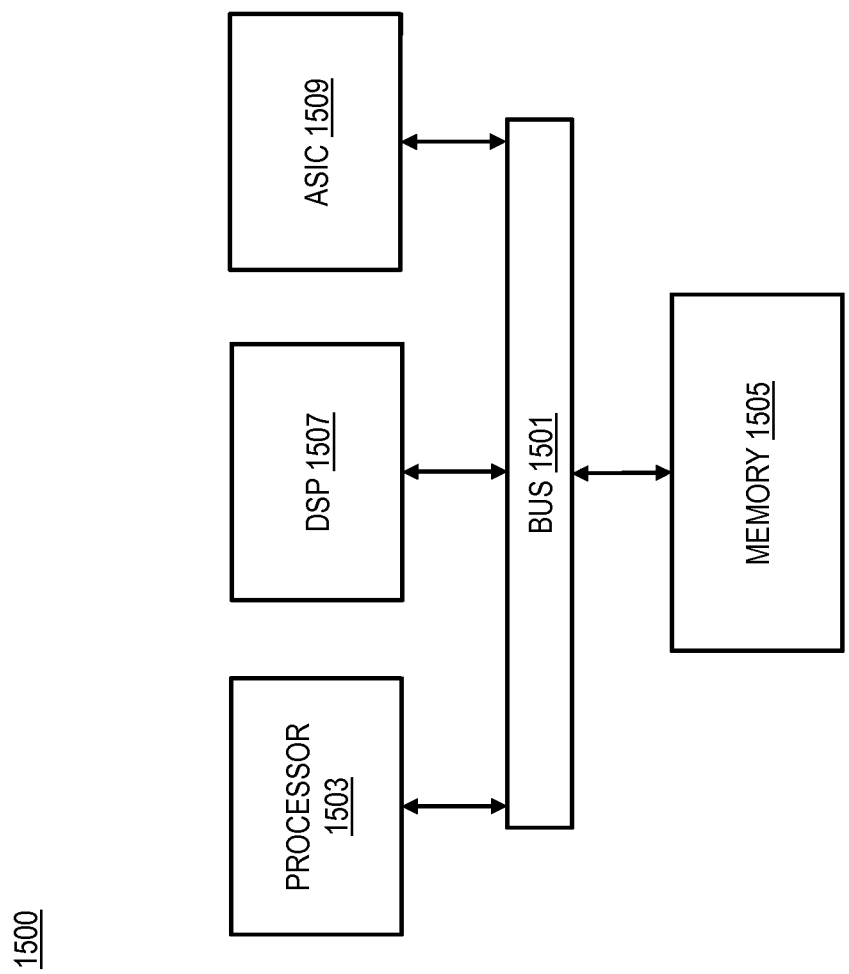
FIG. 15 is a diagram of a chip set that can be used to implement an embodiment of the invention.

In exemplary embodiments, the low latency requirements also enable saving power in the host processor (e.g., as depicted in FIG. 15). For illustration, the following description refers to the components of exemplary chip set of FIG. 15. The D2D radio layer 209 is typically implemented in the ASIC module 909, whereas the functionalities of the awareness services module 111 can be implemented either in the ASIC 909 or the processor 903. If the functionalities of the awareness services module 111 are implemented in the processor 903, power consumption is reduced by, for instance, having ASIC 909 wake up the processor 903 as infrequently as possible. By way of example, the periodic operation of the D2D radio layer 209 explained above enables the ASIC 909 to collect all messages and send them to the processor 903 at a frequency of once per active transmission period 291. The processor 903 then processes all received messages and calculates new messages to be sent for the next active transmission period 291. The processor 903 then sends the messages to the ASIC 909 for transmission. Using this process, a flooding message can make one hop (e.g., travel from one node 101 to another node 101) per period 291, which is fully acceptable for awareness information. In contrast, potential delays of hundreds of milliseconds are not possible, for example, for voice traffic, and these kinds of power savings cannot therefore be achieved in other communication systems transporting delay-sensitive traffic.

Figure 3A:
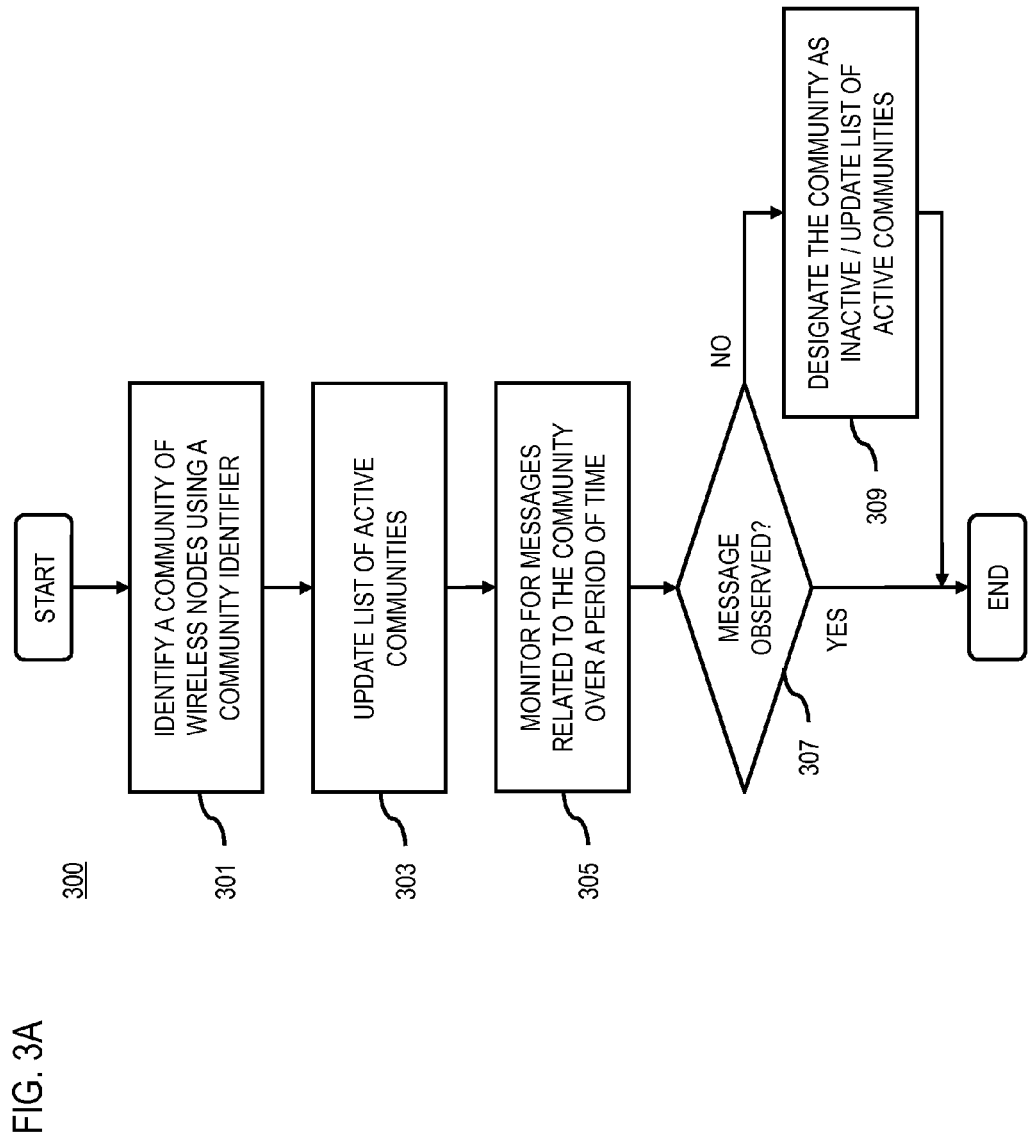

FIGS. 3A-3D are flowcharts of processes for locating communities and community members in the local neighborhood over an ad-hoc mesh network, according to various exemplary embodiments. FIG. 3A is a flowchart for locating active communities over the ad-hoc mesh network 109 and updating a list of the active communities that are visible to a wireless node 101. In one embodiment, the awareness services module 111 performs the process 300 of FIG. 3A and is implemented in, for instance, a chip set including a processor and a memory as shown in FIG. 15. In step 301, the awareness services module 111 identifies one or more communities of wireless nodes 101 by using, for instance, community identifiers (CIDs) corresponding to the one or more communities. In exemplary embodiments, each CID is associated with one or more authentication keys for authenticating members and messages transmitted within the corresponding community. The CIDs and associated keys are stored by the awareness services module 111 in, for instance, the community directory 243 and may be provided to wireless nodes 101 that are members of the community in advance using a secure communication channel over the ad-hoc mesh network 109 or the communication network 103. CIDs and keys that are created subsequently may also be provided using a secure communication channel over either the ad-hoc mesh network 109 or the communication network 103.

By way of example, the awareness services module 111 can use the CIDs to locate and identify communities that are active (e.g., transmitting or receiving community messages) among one or more neighboring wireless nodes 101 by (1) passively monitoring messages directed towards one or more communities over the ad-hoc mesh network 109 using the process described with respect to FIG. 3B below, (2) actively searching for one or more communities using a community search message as described with respect to FIG. 3C below, and/or (3) actively searching for one or more members of the communities using a member search message as described with respect to FIG. 3D. The awareness services module 111 then updates a list of active communities based on the identification (step 303). For example, the list of active communities includes those communities to which the wireless node 101 belongs (e.g., communities that are private such as a community of personal friends) and those communities that are public and open to all nodes 101 (e.g., a general community of all wireless nodes on the ad-hoc network 109 in which system wide messages may be exchanged).

In exemplary embodiments, the awareness services module 111 is continuously updating the list of active communities by, for instance, monitoring for messaging traffic over the ad-hoc mesh network 109 related to one or more of the active communities (step 305). More specifically, the awareness services module 111 tracks whether there are any messages originating from or directed to one or more of the active communities over a predetermined period of time. In one embodiment, the period of time can be dependent on the on the density or stability of neighboring wireless nodes 101. For example, if the composition of the neighboring wireless nodes 101 is changing rapidly, the time period can be shorter. Similarly, if the composition of the neighboring wireless nodes 101 is more stable, the time period can be longer. In either case, the awareness services module 111 observes whether there are any messages related to one or more of the active communities (e.g., by checking the header information of the messages for CIDs corresponding to any of the active communities) (step 307). If no messages are observed over the predetermined period of time for a particular community, the awareness services module 111 designates that community as inactive and updates the list of active communities accordingly (step 309). If a message related to a particular community is observed during the time period, the community is considered to be still active and the awareness services module 111 need not update the list of active communities. It is contemplated that the awareness services module can continuously or periodically perform the monitoring process to update the list of active communities.

Figure 3B:
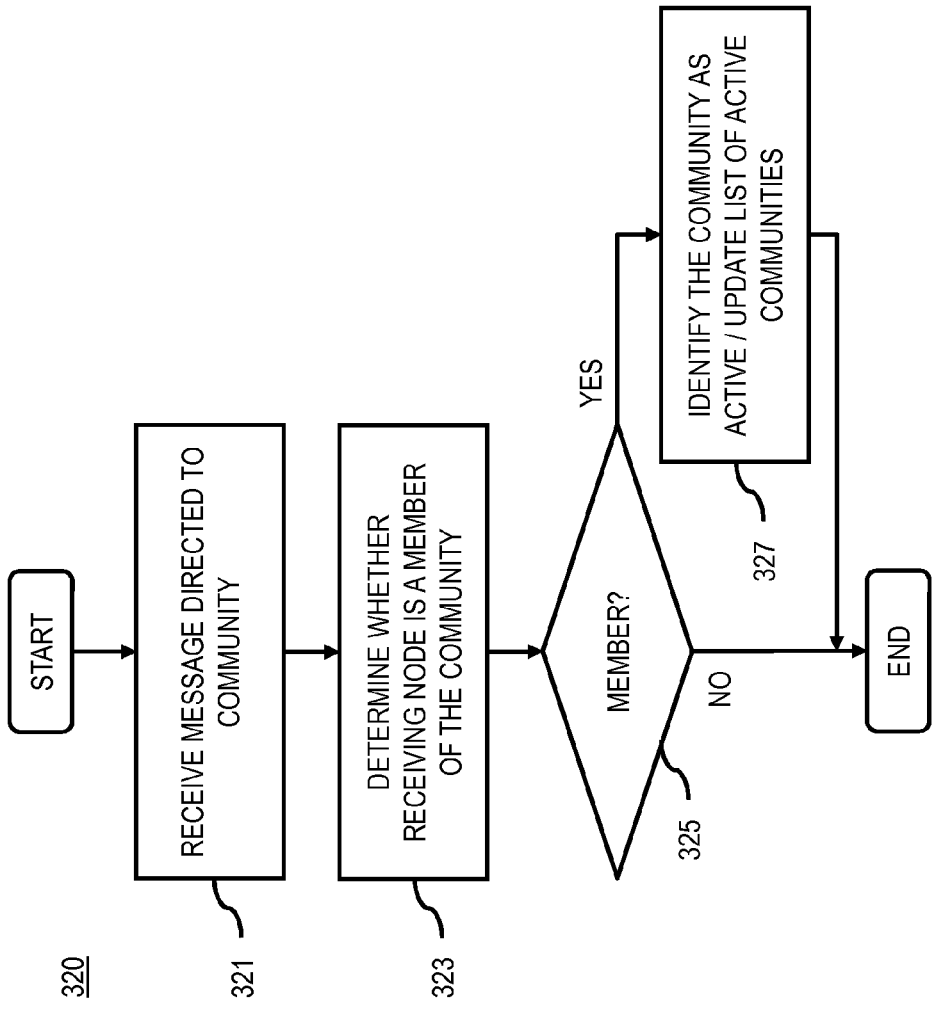

FIG. 3B is a flowchart of a process for passively identifying an active community by monitoring community messages, according to one embodiment. In one embodiment, the awareness services module 111 performs the process 320 of FIG. 3B and is implemented in, for instance, a chip set including a processor and a memory as shown in FIG. 15. In step 321, the awareness services module 111 receives a message directed to one or more communities from a neighboring wireless node 101 over the ad-hoc mesh network 109. The awareness services module 111 then determines whether the receiving wireless node 101 is a member of the community to which the message is directed (step 323). For example, the determination may involve checking whether the CID contained in, for instance, the message header of the received message matches a CID contained in the community directory 243 of the receiving wireless node 101. In certain embodiments, the CID is anonymized to protect the privacy of the community and its members. In this case, the receiving wireless node 101 is a member of the community, the awareness services module 111 may decode the anonymized CID using the authentication key associated with the CID of the community specified in the received message. Further, if the message is encrypted, the awareness services module 111 may open the encryption using the encryption key associated with the CID as listed in the community directory 243. If the awareness services module 111 determines that the receiving node 111 is a member of the community (step 325), the module 111 identifies the community as an active community and updates the list of active communities accordingly (step 327).

FIG. 3C is a flowchart of a process for actively searching for one or more active communities using a community search message, according to an exemplary embodiment. In one embodiment, the awareness services module 111 performs the process 340 of FIG. 3C and is implemented in, for instance, a chip set including a processor and a memory as shown in FIG. 15. In step 341, the awareness services module 111 receives input requesting a search for one or more active communities in the local neighborhood of the ad-hoc mesh network 109. The input is received from, for instance, the application 201 through the application programming interface 225 (as described with respect to FIGS. 2A and 2C). For example, the input may specify one or more communities for which to search. In response, the awareness services module 111 retrieves a CID for each requested community (step 343). In certain embodiments, the CIDs are anonymized to protect the privacy of the community and its members (step 345). Using anonymized CIDs protects privacy by making it more difficult for an outsider to track communications related to any particular community. The community control module 241 then generates a community search message containing a containing a unique community query identifier CQID and a list of anonymized CIDs (step 347).

After creating the message, the awareness services module 111 initiates broadcast of the message over the ad-hoc mesh network 109 (step 349). In exemplary embodiments, the community search message is equivalent to a query and is transmitted and replied to using the processes described with respect to FIGS. 5A and 5B below. As the message propagates over the ad-hoc mesh network 109, mobile devices that are members of one or more of the active communities associated with the anonymized CID or CIDs included in the message automatically respond to mobile device that originally sent the message. The awareness services module 111 initiates receipt of the reply messages (step 351). The reply message contains, for instance, a list of anonymized CIDs of those searched communities which have an "active" status in the replying node 101. Based on this list, the awareness services module 111 identifies each community in the list as an active community and updates the list of active communities in, for instance, the community directory 243 (step 353).

FIG. 3D is a flowchart of a process for actively determining the presence and community-specific identity (e.g., alias) of members of a particular community or communities, according to an exemplary embodiment. In one embodiment, the awareness services module 111 performs the process 360 of FIG. 3D and is implemented in, for instance, a chip set including a processor and a memory as shown in FIG. 15. In step 361, the awareness services module 111 receives input requesting a search for one or more members of a community. The input is received from, for instance, the application 201 through the application programming interface 225 (as described with respect to FIGS. 2A and 2C). For example, the input may specify one or more communities whose members are to be searched for. In step 363, the awareness services module 111 retrieves the CID or CIDs associated with the requested community or communities from the community directory 243. In certain embodiments, the CIDs are anonymized to protect the privacy of the community and its members (step 365). If any one of the communities is set in the "visible" state, the awareness services module 111 also retrieves the community-specific user identity (e.g., an alias) of the user for that community. By way of example, the encryption/decryption module 245 of the awareness services module 111 may also encrypt the user alias in step 365 using, for instance, one or more of the keys associated with each community in the community directory 243. The community control module 241 then generates a member search message containing a unique community query identifier CQID, a list of anonymized CIDs, and corresponding plaintext (in case of a public community) or encrypted (in case of a private community) aliases of the members for which to search (step 367).

After the member search message is generated, the awareness services module 111 initiates broadcast of the member search message over the ad-hoc mesh network 109 (step 369). In exemplary embodiments, the member search message is equivalent to a query and is transmitted and replied to using the processes described with respect to FIGS. 5A and 5B below. As the message propagates over the ad-hoc mesh network 109, mobile devices that have one or more communities associated with the anonymized CID or CIDs in the "visible" state automatically respond to the mobile device that originally sent the message. If aliases corresponding to one or more users are also included in member search message, mobile devices corresponding to the user aliases also respond. The awareness services module 111 initiates receipt of the reply messages sent in response to the member search message (step 371). The reply message includes, for instance, a list of anonymized CIDs, plaintext or encrypted user aliases and, possibly, the plaintext or encrypted status (e.g. activity state, mode, etc.) of the community member. In certain embodiments, the awareness services module 111 uses the reply messages to update the list of visible community members in the local neighborhood (step 373). In addition, the awareness services module 111 also uses the replies to identify active communities within the neighborhood and to update the list of active communities (step 375). The updates are based, for instance, on the anonymized CIDs, the community-specific member identity (e.g., alias), o other member-specific information included in the reply messages.

Figure 4:
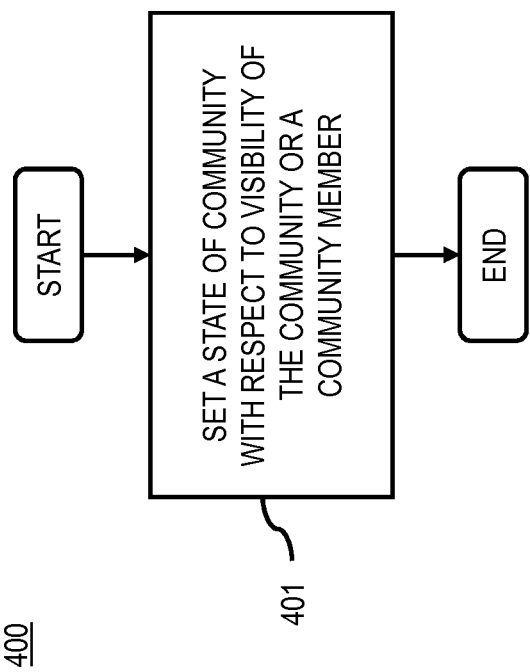
FIG. 4 is a flowchart of a process for setting a state of a community to change the visibility of community or community member, according to an exemplary embodiment.

FIG. 4 is a flowchart of a process for setting a state of a community to change the visibility of community or community member, according to an exemplary embodiment. In one embodiment, the awareness services module 111 performs the process 400 and is implemented in, for instance, a chip set including a processor and a memory as shown in FIG. 15. In step 401, the awareness services module 111 enables the user to set a state corresponding to a community that determines the visibility of the community or a member of the community. The different states of the community and how the state affects the visibility of status of the community are discussed with respect to FIG. 2D. For example, in various embodiments, when a community is active, it is capable of sending and receiving community specific messages. Similarly, when a community member is visible, the user alias associated with the community member can be queried and sent to other community members.

Moreover, it is contemplated that the state of a community in a wireless node 101 can be used to filter incoming messages. For example, to block all incoming or outgoing messages, a user can set the state of a community to inactive so that all messages from that particular community are disregarded. It is contemplated that a user belonging to multiple communities may independently set the visibility state for each community. By way of example, to block incoming advertisements, the user can set the state to inactive for the community sending the advertisements. It is also contemplated that the user can automatically set the visibility state based on criteria such as time (e.g., to automatically set a visibility state at certain periods of the day), location (e.g., to automatically set a visibility state at certain locations such as work or school), or any other context (e.g., while in a meeting or at dinner).

FIG. 5A is a ladder diagram that illustrates a sequence of messages and processes used in a querying node, according to an exemplary embodiment. A network process is represented by a thin vertical line. A step or message passed from one process to another is represented by horizontal arrows. A dashed horizontal arrow represents an optional step or message. The processes represented in FIG. 5A are the querying node 502, relaying node 506, and replying node 508. Within querying node 502, the following additional processes are represented: application 201, awareness layer 203, community layer 205, network layer 207, and D2D radio layer 209.

In step 501, the application 201 within querying node 502 generates a request for searching community information (e.g., wireless nodes 101 having active communities or communities with visible members) over the ad-hoc mesh network 109 and sends the request to the community layer 205 of the querying node 502. The community layer 205 generates a community query message, assigns a community query identification number (CQID) to the query message and prepares the query message for transmission over the ad-hoc mesh network 109 by marking the query with CIDs of the communities from which the user is seeking information. If the user seeks information on members of the communities and the communities are private, the community layer 205 encrypts the community-specific user identity (e.g., alias) using the encryption keys associated with the respective CID and stored in the community directory 243 (FIG. 2C). If the community directory 243 contains recent information about active communities in other nodes then the community layer 205 may return the community information (step 503). The community layer 205 then sends the anonymized and partly encrypted message to the network layer 207 (step 505).

The network layer 207 assigns a message sequence number (MID) to the query message and adds fields to the network layer message header 281 (FIG. 2F) to indicate that the querying node 502 is the source and transmitter of the query message (e.g., using the NID). The network layer 207 sends the query message to the D2D radio layer 209 of the querying node 502 for broadcasting in the ad-hoc mesh network 109 (step 507).

The query message is then broadcasted to one or more relaying nodes 506 (step 509). All the nodes that are able to receive the broadcast message are relaying nodes. After processing by the relaying node 506, the query message is rebroadcasted to another relaying node or to the replying node 508 (step 511). The processes of the replying node 508 are described with respect to FIG. 5C. After processing of the query message by the replying node 508, a reply message is generated and sent to the relaying node 506 (step 513) which routes the reply message either to another relaying node or to the querying node 502 (step 515) based on the route stored in the routing table 273.

At the querying node 502, the D2D radio layer 209 receives and acknowledges the reply message and forwards the reply message to the network layer 207 (step 517). The network layer 207 determines that the querying node 502 is the intended destination of the reply message by checking the DST field 294 in the network layer message header 281 and sends the message to the community layer 205 for processing (step 519). In case of a private community, the community layer 205 decrypts the reply message using the appropriate encryption keys stored in the community directory 243. Based on the information in the reply message, the community layer 205 updates information in the community directory 243 (list of active communities and the lists of visible members in the communities) and finally sends a service response to the query to the application 201 (step 521).

Figure 5B:
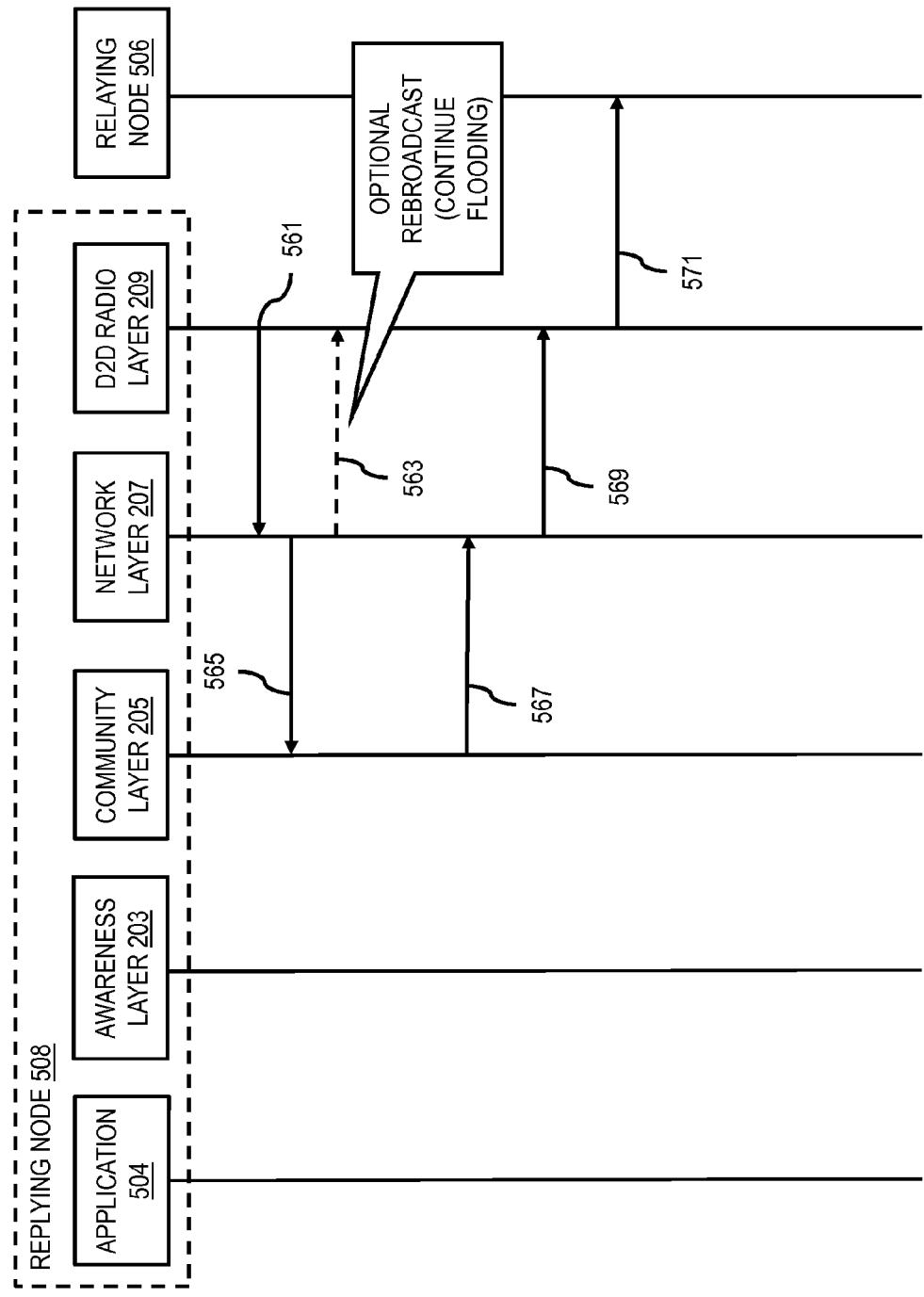
FIG. 5B is a ladder diagram that illustrates a sequence of messages and processes used in a replying node, according to an exemplary embodiment.

FIG. 5B is a ladder diagram that illustrates a sequence of messages and processes used in a replying node, according to an exemplary embodiment. A network process is represented by a thin vertical line. A step or message passed from one process to another is represented by horizontal arrows. A dashed horizontal arrow represents an optional step or message. The processes represented in FIG. 5B are the replying node 508 and the querying node 502. Within replying node 508, the following additional processes are represented: application 201, awareness layer 203, community layer 205, network layer 207, and D2D radio layer 209.

In step 561, the D2D radio layer 209 of the replying node 508 receives the query message and forwards it to the network layer 207 of the replying node 508. The network layer 207 may decide to rebroadcast the query message (step 563). On receipt, the network layer 207 forwards the query message to the community layer 205 (step 565).

If the community layer 205 determines that the query message contains one or more anonymized CIDs of the active communities associated with the replying node 508 and the query message contains encrypted user aliases, the community layer 205 decrypts the message and updates information in its community directory 243 (e.g., containing the list of active communities and the list of visible members of the communities). Next, the community layer 205 generates a reply message that contains the same CQID as the incoming query and has the source NID of the query message set as the destination NID of the reply message. If the query requests visible user aliases and the user alias in the node 508 is set as visible then the community layer 205 encrypts the user alias with the encryption keys associated with the community. The community layer 205 then retrieves a new anonymized CID from the community directory 243 and sends the reply message to the network layer 207 (step 567).

On receipt of the reply message, the network layer 207 assigns a new message sequence number (MSN) to the reply message, attaches the NID of the replying node 508 as the source and transmitter, finds the NID of the relaying node 506 for the next hop from the routing table 263, sets the receive NID of the reply message as the next hop and sends the reply message to the D2D radio layer 209 (step 569). The D2D radio layer 209 sends the reply message as a unicast message addressed to a relaying node 506 over the ad-hoc mesh network 109 (step 571).

Figures 6A, 6B:
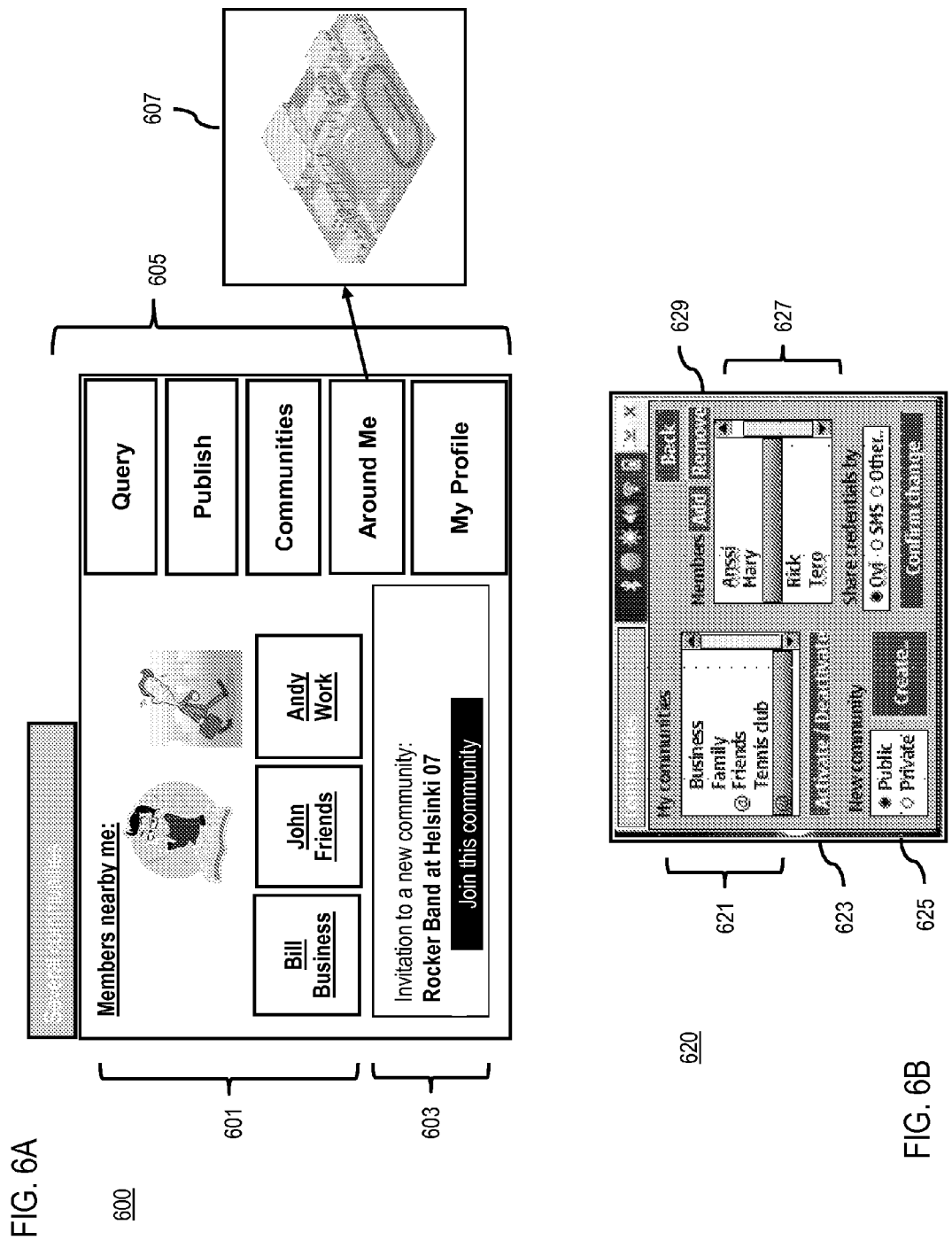
FIGS. 6A-6B are diagrams of a user interface utilized in the process of locating communities over an ad-hoc mesh network, according to various exemplary embodiments.

FIGS. 6A-6B are diagrams of a user interface utilized in the process of locating communities over an ad-hoc mesh network, according to various exemplary embodiments.

FIG. 6A depicts a user interface 600 listing community related information and commands for managing and accessing awareness information. For example, section 601 lists community members who are nearby the wireless node 101. The members may be from one or more different communities. Selecting a member enables a user to contact the member, view the status of the member, or access other applications or functions related to the user. Section 603 may display, for instance, status commands or prompts such as an invitation to join a particular community. User interface 600 also provides selectable menu options 605 to initiate additional commands. For example, selecting the option "Around Me" prompts the display of a map 607 with the locations of community members.

FIG. 6B depicts a user interface 620 for managing communities. For instance, section 621 displays currently defined communities with an option 623 to activate or deactivate each community individually. Users may also designate each community as either public or private using the control 625. Members of each community are displayed in section 627, along with controls 629 for adding or removing members.

Figure 7:
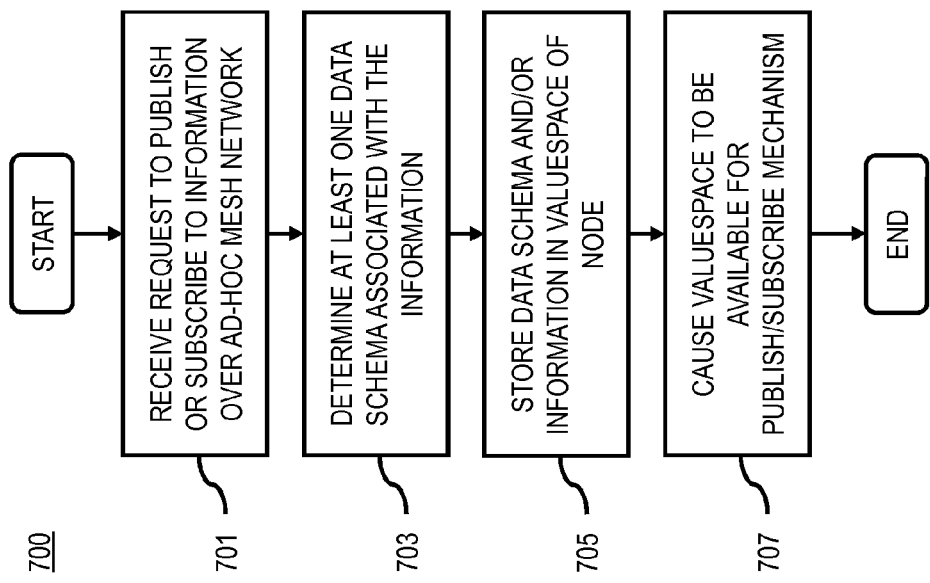
FIG. 7 is a flowchart of a process for determining a data schema for publishing or subscribing to information over an ad-hoc mesh network, according to an exemplary embodiment.

FIG. 7 is a flowchart of a process for determining a data schema for publishing or subscribing to information over an ad-hoc mesh network, according to an exemplary embodiment. In one embodiment, the awareness services module 111 performs the process 700 and is implemented in, for instance, a chip set including a processor and a memory as shown in FIG. 15. In step 701, the awareness services module 111 receives a request to either publish or subscribe to information provided over an ad-hoc mesh network. In one embodiment, the request is received from, for instance, one or more applications (e.g., application 201) executing on a wireless node 101a.

Next, the awareness services module 111 determines at least one data schema or an instance of the at least one data schema associated with the information (step 703). As previously discussed, the data schema defines, for instance, the type and format of information that is to be sent or received by the requesting applications. By way of example, the data schema may include field definitions, data types, data structures, and the like associated with the information. In addition or alternatively, the data schema may specify metadata for describing the types or formats of information requested by the application. In one embodiment, the data schema is defined by the one or more applications making the request. It is contemplated that, in one embodiment, the applications may define more than one data schema or define multiple instances of the same schema in connection with publishing and/or subscribing to information.

In yet another embodiment, the subscription may also be associated with one or more filters. By way of example, when an application initiates a subscription for information, the application may provide subscription filters in addition to the data schema. Subscription filters specify further limitations to the subscription including, for instance: (1) values or value sets for files so that responses should contain the specified value constraints; (2) time constraints, e.g., time intervals when new information is provided to subscribing applications; (3) environmental constraints, e.g., information is made available to applications when neighboring nodes 101 and/or other characteristics of the ad-hoc mesh network 109 have changed above a given threshold.

After determining the at least one data schema, the awareness service module 111 initiates at least one instance of the data schema. For example, initiation of the data schema may include determining to store the data schema in the valuespace of at least one corresponding wireless node 101 of the ad-hoc mesh network 109 (step 705). In one embodiment, identification of the information for publication or subscription is based, at least in part, on the at least one data schema. In other words, the data schema serves as criteria for associating published information against subscriptions for the information. The awareness services module 111 then causes, at least in part, the valuespace to be made available for publication, subscription, querying, or a combination thereof by one or more other nodes 101 of the ad-hoc mesh network 109.

For example, to publish information, the awareness services module 111 initiates at least one instance of the data schema by, for instance, storing the data schema and corresponding information item(s) in the valuespace of the publishing wireless node 101a. Then, on the subscription side, the awareness services module 111 of a subscribing wireless node 101b generates a subscription query including, at least in part, a target data schema that defines the information that subject to the description. In one embodiment, the same applications need not be used to define the published data schema and the target or subscribed data schema. In other words, a different application may be used to subscribe to information published by another application.

In some embodiments, the awareness services module 111 can generate a hash value by applying, for instance, a hash function to the data schema to reduce the amount of data that is to be included in the query or response messages transmitted over the ad-hoc mesh network 109. It is also contemplated that any other form of compression may be used to reduce the memory size of the data schema message for transmission. Then the receiving wireless node 101 can apply the same hash function or compression scheme to extract the data schema specified in either the query or response message. The process for subscribing to information over an ad-hoc mesh network is described in more detail with respect to FIG. 8 below.

Figure 8:
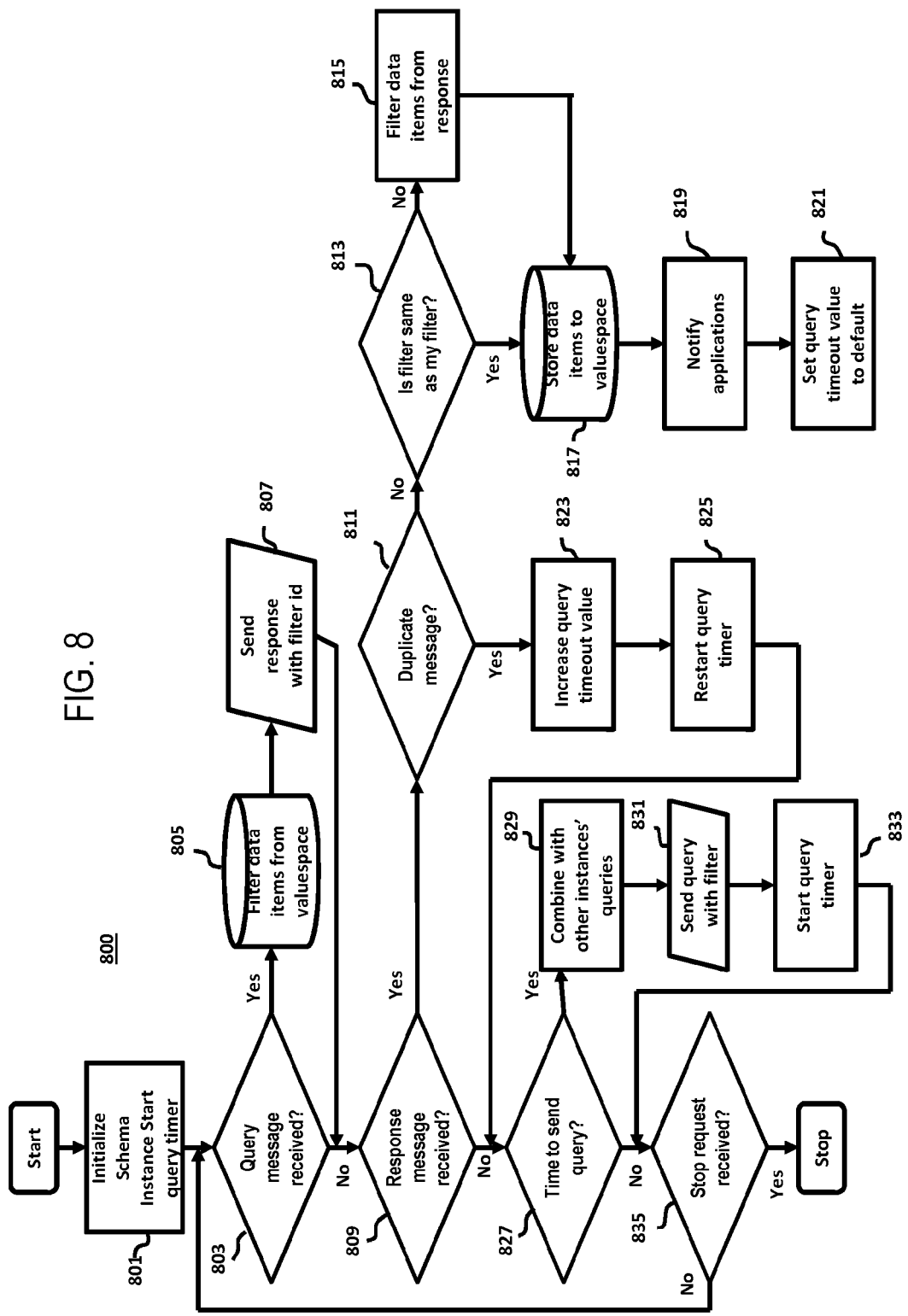
FIG. 8 is a flowchart of a process for subscribing to information over an ad-hoc mesh network, according to one embodiment.

FIG. 8 is a flowchart of a process for subscribing to information over an ad-hoc mesh network, according to one embodiment. In one embodiment, the awareness services module 111 performs the process 800 and is implemented in, for instance, a chip set including a processor and a memory as shown in FIG. 15. In step 801, the awareness services module 111 of a subscribing wireless node 101a initiates a subscription query by, for instance, initializing an instance of a data schema describing the subscribed information. At the same time, the subscribing wireless node 101a generates and transmits a subscription query message including, at least in part, the data schema (or a hash of the data schema) and broadcasts the query over the ad-hoc mesh network 109 using, for instance, the messaging process described above. In one embodiment, the query message may also include one or more filters and/or filter identifiers (IDs) corresponding to the one or more filters specified by the subscribing wireless node 101a. In one embodiment, a filter ID may be a hash value calculated from the filter. In this way, the filter itself need not be included. By way of example, the filters may specify one or more criteria for selecting from among information items that match or substantially match the data schema specified in the query. In one embodiment, on transmission of the query, the awareness services module 111 also starts a query timer to determine when it should next resend the query message to, for instance, obtain information from new nodes 101 that might have join the ad-hoc mesh network 109.

If another wireless node 101b receives the query message (step 803), the awareness services module 111 of the receiving wireless node 101b determines whether there are any information or data items it its valuespace that at least substantially matches the requested data schema. If there are matching information, the awareness service module 111 filters the matching data items from the valuespace and generates a response message based, at least in part, on the matching items (step 805). It is noted that, in one embodiment, the awareness services module 111 need not match all data types or formats specified in the data schema of the query message. Instead, the awareness services module 111 might match just one or more of the elements of the data schema (e.g., compare only the name filed of a contact data structure, while ignoring matches for the address fields) to find responsive data or information items. The receiving wireless node 101b then broadcasts the response message over the ad-hoc mesh network 109 (step 807). If filtering was performed to generate the response, the response message may also include the corresponding filter and/or filter ID.

If the response message is received by the subscribing wireless node 101a (step 809), the awareness services module 111 determines whether the response message is a duplicate of one or more messages that have already been received (step 811). If it is not a duplicate message, the awareness service module 111 determines whether the response message includes the same filter ID specified by the subscribing application (step 813). If no filter ID is specified or the filter ID does not match, the awareness services module 111 determines to filter the information or data items from the response message (step 815), and then stores the data items in the valuespace of the subscribing wireless node 111 (step 817). If the filter ID matches or substantially matches, the awareness services module 111 stores the information or data items in the response message (or indicated by the response message) in the valuespace without further filtering. On storing the data items, the awareness services module 111 notifies the subscribing application or applications that the subscribed information is available in the valuespace (819) and resets the query timer to determine when next to query for newly available published information (step 821).

If, at step 811, the awareness services module 111 determines that the response message is a duplicate message (e.g., the same message has been relayed or received from another wireless node 101), then the awareness services module 111 disregards the message and resets and then restarts the query timer (steps 823 and 825).

At step 827, the awareness services module 111 determines whether to resend the query based on the query time. If it is time to resend the subscription query to search for newly available published information, the awareness services module can then determine whether to combine the query message with other query messages originating from, for instance, other subscription instances or data schemas (step 829). The query along with any specified filter to select from among responsive data items is then sent or broadcast over the ad-hoc mesh network 109 (step 831). At the same time the query timer is restarted to continue the subscription query process (step 833). In one embodiment, the querying process is continued until a stop request is received (step 835). In other embodiments, the subscription may be associated with a specific duration or effective period. In this case, the subscription querying process continues for the specified duration or until the subscription expires.

Figure 9:
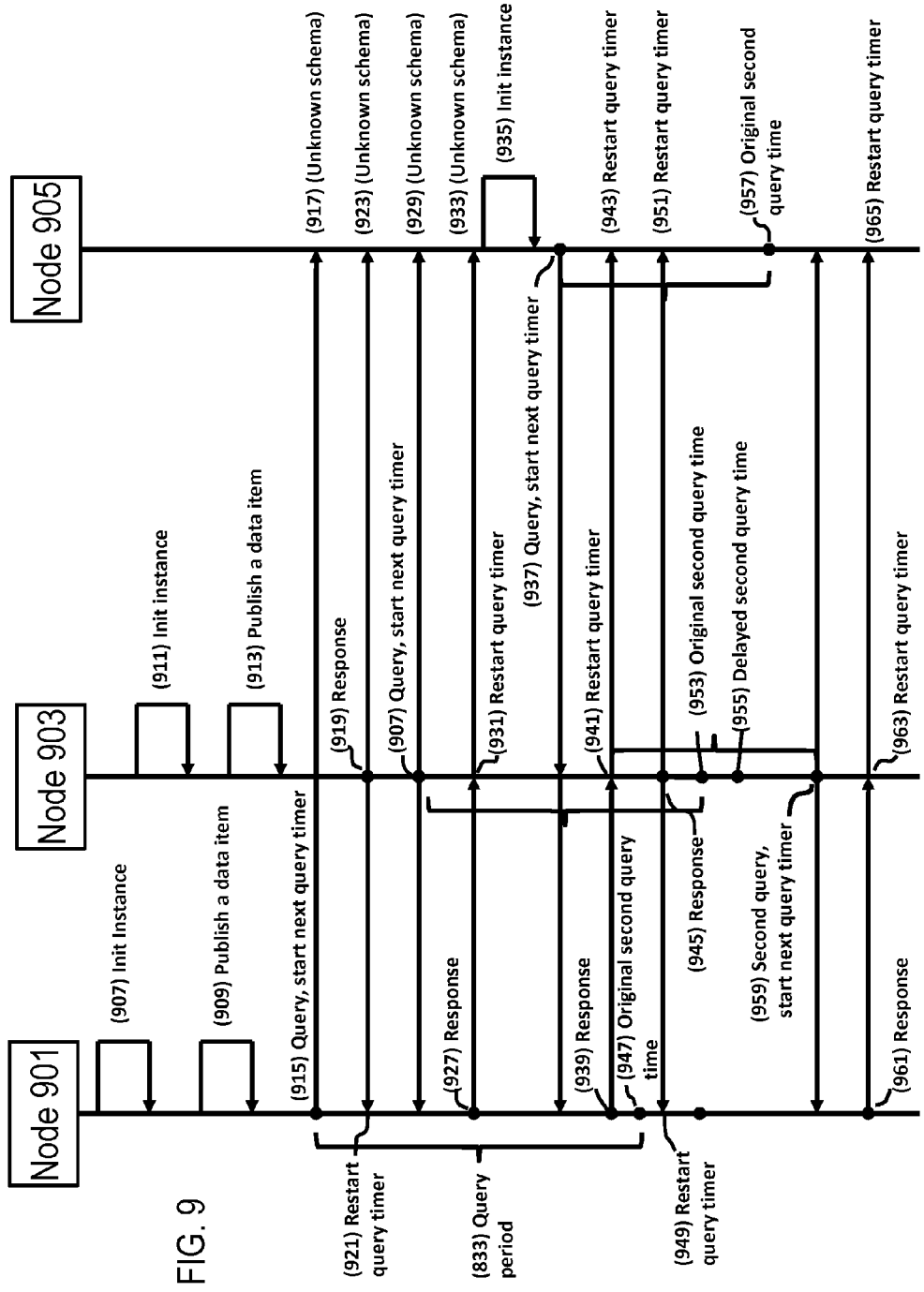
FIG. 9 is a ladder diagram that illustrates a sequence of messages and processes for delaying subscription queries for information published over an ad-hoc mesh network, according to one embodiment.

FIG. 9 is a ladder diagram that illustrates a sequence of messages and processes for relaying subscription queries for information published over an ad-hoc mesh network, according to one embodiment. A network process is represented by a thin vertical line. A step or message passed from one process to another is represented by horizontal arrows. A dashed horizontal arrow represents an optional step or message. The processes represented in FIG. 9 are nodes 901-905 which are engaged in a publish/subscribe process over an ad-hoc network 109.

As previously described, the wireless nodes (e.g., nodes 901-905) engaged in a publish/subscribe process can optimize the signaling of its messages to reduce message traffic over the ad-hoc mesh network 109. One process, as described with respect to FIG. 9, includes delaying queries for subscribed or published information. In step 907, the node 901 initiates a data schema instance to publishing and/or subscribe to data items. Under the data schema instance, the node 901 publishes a data item associated with the data schema into its valuespace (step 909). Shortly thereafter, the node 903 initiates its instance of the same or similar data schema (step 911) and also publishes a data item to its valuespace.

At step 915, node 901 initiates a query for published information responsive to its data schema instance. In one embodiment, the query acts as a way to convey the subscription to other nodes (e.g., nodes 901 and 905). It is contemplated that one than one query can carry the subscription and that a single query can carry multiple subscriptions. Furthermore, a query message may include multiple nested data items include subscription information, one or more queries, one or more query responses, other data items (e.g., including unrelated data items), and/or other messages or signaling information transmitted over the ad-hoc mesh network 109. In this case, the query is transmitted to both the node 903 and node 905 over the ad-hoc mesh network 109. At step 917, node 905 receives the query but ignores the message because the specified data schema is unknown to it because it has not yet initiated a similar data schema instance. At step 919, the node 903 receives the same query and determines that it's publish item is responsive and transmits a response message received by both the node 901 and node 905. The node 901 receives the response and restarts its query time because it has received responsive information (step 921). The node 905 again ignores the message because it has not initiated an instance of a matching or substantially matching data schema (step 923).

At step 925, the node 903 generates and transmits a query under its data schema instance. The node 901 has responsive information and transmits a response message (step 927). The node 905 again ignores the message because it does not have an instance of a responsive data schema (step 929). Meanwhile, the response 927 from the node 901 is received at the node 903, which also causes the node 903 to restart its query timer because it has received responsive information based on its query 925. The response 927 also reaches the node 905, but is again ignored because the node 905 does not have an instance of a responsive data schema (step 933).

Next, the node 905 initiates data schema instance to subscribe to information related to the data schemas already initiated by nodes 901 and 903 (step 935). The node 905 generates and transmits a query message and starts its query time (step 937). The query 937 from the node 905 is received at both the nodes 901 and 903. Node 901 generates and transmits a response (step 939). At 941, the response 939 is received at node 903. Even though the response was broadcast in response to the query 937 of the node 905, the response 939 nonetheless matches or substantially matches the subscription created the node 903 that is carried in the query 925 that is scheduled for retransmission at step 953.

Accordingly, the node 903 restarts its query timer (also at step 941), which effectively delays the schedule retransmission 953 to a later retransmission at 955. In this way, the number of messages is advantageously reduced by delaying querying for additional information when the node 903 already has the latest information based on the query 937 of the node 905.

At step 947, the node 901 delays its scheduled second query because based on the response 945 by the node 903 to the query 937 is responsive to the subscription initiated by the node 901. In this example, the response 945 is also responsive to the query 937 of the node 905. Accordingly, the nodes 901 and 905 both restart their respective query timers (respectively at steps 949 and 951). The restarting of the timer also effectively delays the original resending of the node 905's query (step 957).

As a result, the next query is effectively at step 959 by the node 903 based on, for instance, the ongoing query timers. The process then continues as previously described beginning with a response 961 from the node 901 with is then received at the nodes 903 and 905. On receipt of the response, the query timer's at the nodes 903 and 905 are restarted (respectively at steps 963 and 965). In this way, the different query timers of the nodes 901-905 effectively and advantageously timed to reduce overall messaging traffic arising from the various embodiments of the publish/subscribe mechanism described herein.

Figure 10:
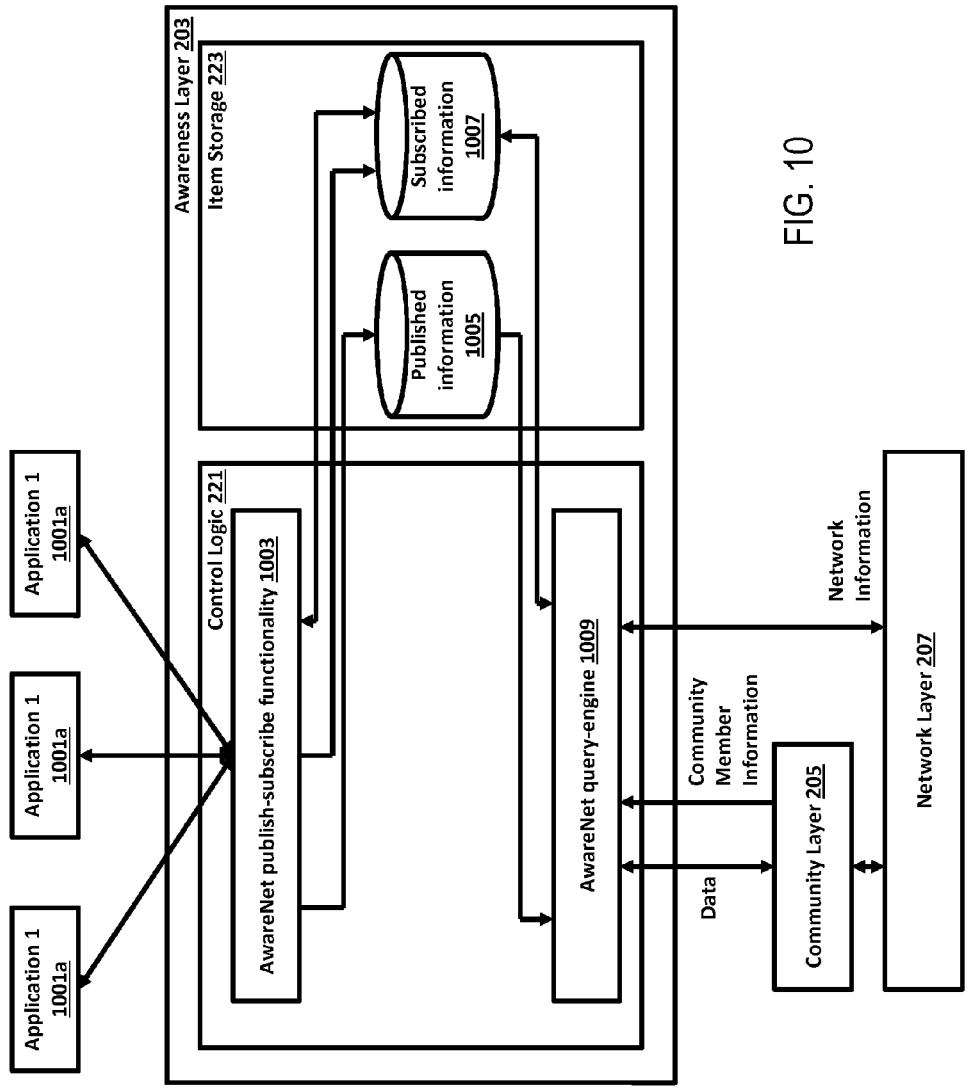
FIG. 10 is a diagram of components of a node associated with coordination of information request messages over an ad-hoc mesh network 109, according to one embodiment.

FIG. 10 is a diagram of components of a node associated with coordination of information request messages over an ad-hoc mesh network 109, according to one embodiment. As illustrated, at least in part, in FIG. 9, the number of information request messages generated during a publish/subscribe process can quickly multiply as queries and responses are propagated over the ad-hoc mesh network 109. Accordingly, there is a need for coordination of such information request messages to minimize network traffic and associated resource burdens. In one embodiment, at least one of the wireless nodes 101 includes one or more components for coordinating information request messages over the ad-hoc mesh network 109. In some embodiments, all or substantially all of the wireless nodes 101 participating in an information exchange (e.g., participating in a publish/subscribe process) include at least some of the components for coordinating information request messages. It is contemplated that the functions of these components may be combined in one or more components or performed by other components of equivalent functionality.

As shown in FIG. 10, the components include one or more applications (e.g., applications 1001a-1001c) with connectivity or access to the ad-hoc network publish-subscribe functionality 1003. In this example, the applications 1001a-1001c include any application executing at a wireless node 101 that can request and/or receive information over the ad-hoc mesh network 109. In addition, the publish/subscribe functionality 1003 include the publish/subscribe mechanism and its related functions and processes described with respect to FIGS. 7-9 above. For example, the publish/subscribe functionality 1003 provides publish and subscribe services to the applications 1001a-1001c. In one embodiment, the publish/subscribe functionality 1003 is specific to a particular wireless node 101 (e.g., acts on information requests from only those applications executing on a single wireless node 101). In one embodiment, the components of FIG. 10 are implemented in or refinements of the components described with respect to FIG. 2B wherein, e.g., the control logic 221 of FIG. 2B provides the publish/subscribe functionality 1003 and/or the query engine 1009 (e.g., described below), and the item storage 223 of FIG. 2B represents the published information 1005 and/or the subscribed information 1007.

In one embodiment, any of the applications 1001a-1001c may publish information that the publish/subscribe functionality 1003 stores in for instance the published information database 1005. By way of example, information within the system 100 generally consists of an identification part (an instantiated data schema) and a value part (published data) which are then stored in the published information database 1005. Accordingly, an application 1001 may then subscribe to information from the published information database 1005 based on the information's data schema and/or its value (by specifying a subscription filter). The subscription is then stored in the subscribed information database 1007. In one embodiment, the published information database 1005 and the subscribed information database 1007 are part of the valuespace of the publish/subscribe functionality 1003 of the corresponding wireless node 101.

In one embodiment, subscriptions can generally be categorized as either a temporal subscription or a non-temporal subscription. For example, a temporal subscription provides information to the subscribing application 1001 periodically or according to a predetermined schedule. For example, a temporal subscription may be used to subscribe to sensor readings (e.g., a temperature reading) that are determined at fixed intervals. A non-temporal subscription provides information to the subscribing application 1001 when such information is available. For example, a non-temporal subscription to a blog post will provide information whenever such a post is published by the author.

In one embodiment, the ad-hoc network query engine 1009 implements the subscriptions (e.g., temporal and non-temporal subscriptions) stored in the subscribed information database 1007 as a message exchange (e.g., information request messages) between nodes 101 of an ad-hoc mesh network 109. For example, the query engine 1009 sends a query message for the subscribed information that spreads among the nodes 101 of the ad-hoc mesh network 109 (see also the FIGS. 7-9 above and FIGS. 12 and 13 below).

In one embodiment, for temporal subscriptions that specify fixed or periodic intervals for obtaining the subscribed information, the query engine 1009 generates and transmits the subscription query at the requested intervals. For non-temporal subscriptions, in one embodiment, the query engine 1009 holds the corresponding subscription query and then determines when to transmit or trigger the subscription query based on context information concerning the ad-hoc mesh network 109, the nodes 101 of the ad-hoc mesh network 109, and the like. For example, the community layer 205 and the network layer 207 of the awareness services module 111 can provide at least a portion of the context information for determining to when to transmit an information request message (e.g., a query or a response to the query). In addition, it is contemplated that query engine 1009 may also use other inputs such as published information and sensor information to determine when to transmit the information request message. In one embodiment, the query engine can assign different weights to the various elements of the context information to determine when to transmit the information request message. The process for determining when to transmit information request messages is described in more detail with respect to FIG. 11.

Figure 11:
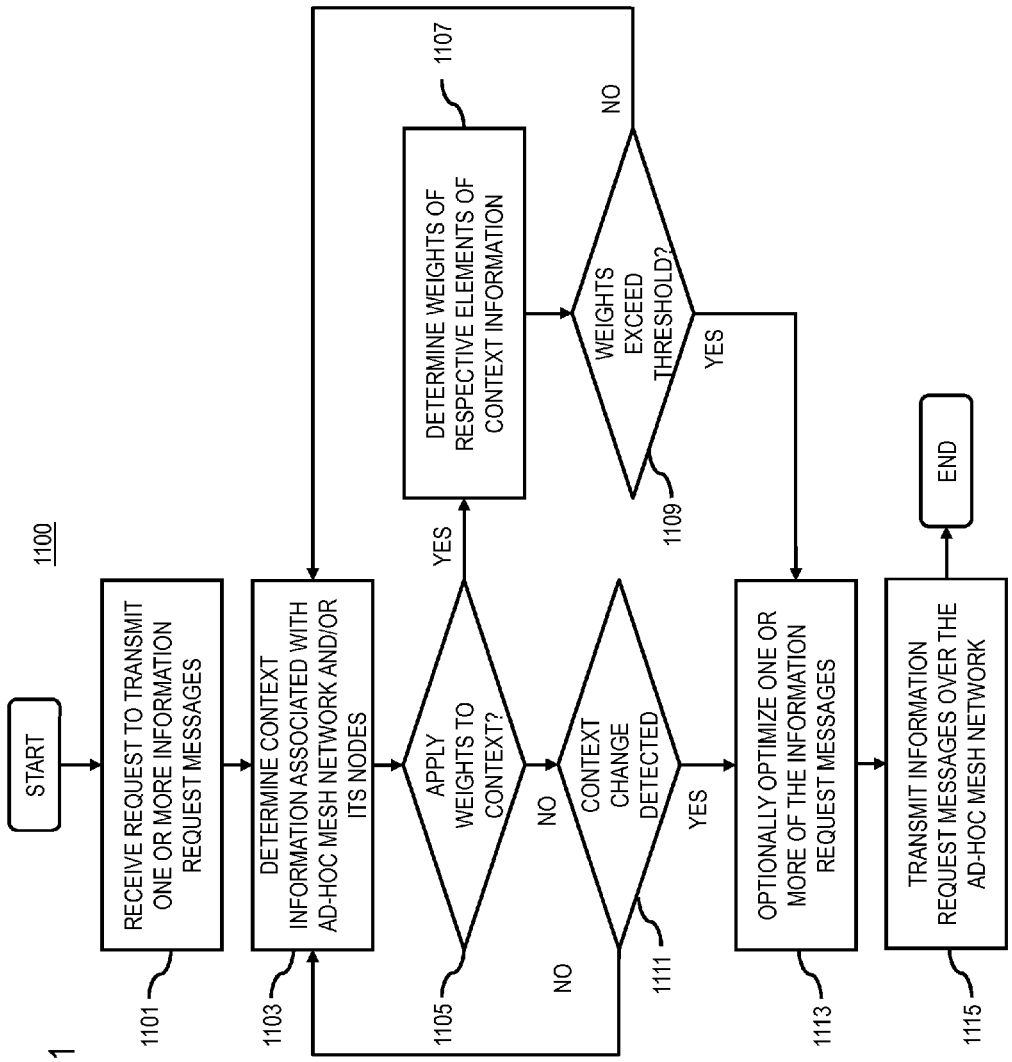
FIG. 11 is diagram illustrating the process for coordinating information request messages over an ad-hoc mesh network, according to one embodiment.

FIG. 11 is a flowchart of a process for coordinating information request messages over an ad-hoc mesh network, according to one embodiment. In one embodiment, the query engine 1009 performs the process 1100 and is implemented in, for instance, a chip set including a processor and a memory as shown in FIG. 15. In addition or alternatively, the awareness service module 111 can perform all or a portion of the function of the query engine 1009. In step 1001, the query engine 1009 receives at least one request to transmit one or more information request messages over an ad-hoc mesh network. As discussed above, the request may originate from one or more applications employing the publish/subscribe functionality 1003 or other information exchange mechanism.

The query engine 1009 then determines context information associated with at least a portion of the ad-hoc mesh network, one or more nodes within the at least a portion of the ad-hoc mesh network, or a combination thereof (step 1103). By way of example, the context information may be based, at least in part, on network traffic, network topology, sensor information from the one or more nodes 101, published information, or any combination thereof. In one embodiment, the context information comes from information that is already gathered as part of the operation and maintenance of the ad-hoc mesh network 109. More specifically, the community layer 205 and the network layer 207 of the awareness services module 111 can provide such context information.

For example, the community layer 205 already collects and can provide context information such as which members (e.g., nodes 101) are reachable over the ad-hoc mesh network 109. Similarly, the network layer 207 can provide context information such as: (1) the number of neighboring nodes 101 within a particular area of the ad-hoc mesh network 109, (2) the estimated number of total nodes 101 in the network, and (3) how dynamic the ad-hoc network is such as how many neighboring nodes have changed (e.g., join or leave the network 109), and how the estimated size of the network 109 is changing. It is contemplated that the community layer 205 and the network layer 207 may provide any information that is collected during their respective operation as context information that can be used by the query engine 1009 to coordinate the transmission of information request messages.

In one embodiment, the community layer 205 and the network layer 207 collect the context information from data traffic that passes through a respective node 101. In another embodiment, the community layer 205 may also use its own community member detection protocol as described above. In addition, in one embodiment, the network layer 207 has a larger view of the network topology and is, therefore, aware of nodes 101 that are multiple hops away in the ad-hoc mesh network 109.

Next, the query engine determines whether weights are to be applied to the context information (step 1105). In other words, different elements or pieces of the contextual information may have difference significances when determining when to trigger transmission of the information request messages. For example, time since a last query might be one element of the contextual information and the number of new nodes 101 joining the network might be another element. In this case, one weighting scheme might give more weight to the number of new nodes 101 because this might be more likely to result in new responsive information than the passage of time since a last query. If weights are to be applied, the query engine 1009 determines respective weights for one or more elements of the context information (step 1107). If the weights exceed to a predetermined threshold value, then the query engine proceeds to step 1113 to begin processing the information request messages for transmission. If the weights do not exceed the predetermined threshold, then the query engine 1009 can continue to monitor for changes in the context information and return to step 1103. In one embodiment, the applications 1001 generating the information message requests may specify various contextual elements or types to consider and their weighting values.

If the decision at step 1005 is that no weights are to be applied, the query engine 1009 can apply a simpler analysis of the contextual information. The query engine 1009 evaluates the context and determines whether it has changed such that triggering conditions are fulfilled. For example, the query engine 1009 may determine whether a new node 101 has joined the ad-hoc mesh network 109 (step 1101) and transmission parameters associated with the subscription state that a query shall be sent if (1) a new node joins the network and (2) at least a given time interval has elapsed from the previous query (step 1111). If no new node has joined the network, the query engine 1009 can continue to monitor for changes in the context information and return to step 1103. If a new node 101 has joined, it is a possibility that the new node 101 has new information that should be queried for responsiveness to an information request.

Accordingly, the query engine can proceed to step 1113 to initiate a process to transmit the one or more information request messages based, at least in part, on the context information (e.g., context meets predetermined criteria, assigned weights of context elements exceeds a threshold value, etc.). In other words, the query engine 1009 evaluates the context information to determine the likelihood that new information is available over the ad-hoc mesh network 109 since the last query for information. If the likelihood reaches a certain threshold, then the transmission of the information request messages can proceed.

In one embodiment, the one or more information request messages are associated with one or more transmission parameters related to determining when to transmit the one or more information request messages. By way of example, the transmission parameters may specify which of the contextual elements are to be considered when coordinating the transmission of associated information request messages. The parameters also may specify, for instance, criteria or thresholds for evaluating the contextual elements. For example, one transmission parameter may be based on rate of messages (e.g., number of message per a given period of time) transmitted over the ad-hoc mesh network 109, and another parameter may specify the threshold rate. It is contemplated that the subscribing applications 1001 may specify any transmission parameter (e.g., time, message frequency, network turnover, etc.) for use by the query engine 1009 in determining when to trigger information request messages.

In one embodiment, to initiate the transmission process, the query engine 1009 can optionally determine to optimize one or more of the information request messages for transmission (step 1113). For example, the query engine 1009 can determine to concatenate at least a portion of the one or more information requests messages into a common message for transmission. More specifically, the query engine 1009 any one or more concatenation strategies. In one embodiment, the query engine 1009 may combine queries originating from different application subscriptions as a single query by concatenating the queries using the logical OR operation. If a node 101 receiving the combined query has information about any of the query parts then it returns a reply combining that information. This advantageously minimizes the number of information request message (e.g., query and reply messages). In another embodiment, the query-engine 1009 may include published information in a query message. Thus, the query-engine 1009 can, at the same time, both send its own published information and request for information in other nodes 101. If an application does not specify explicit transmission parameters for a subscription then the publish/subscribe functionality 1003 and/or the query engine 1009 may specify default transmission parameters for the subscription. A default transmission parameters may be, e.g., "a new node joins the ad-hoc network AND at least 30 seconds has been elapsed from a previous query."

In yet another embodiment, the query engine 1009 may determine how the information request messages should be transmitted (e.g., as broadcast message or a unicast message). For example, the query engine 1009 may decide to send a reply as a broadcast message instead of a unicast message directed to the querying node 101. Thus, the information can be delivered more widely in the ad-hoc mesh network 109 to reach other nodes 101 that may potentially want the same information. Conversely, the query-engine 1009 may decide to send the reply as a unicast message if the replying node 101 has just previously broadcasted the same information. Thus, only the querying node 101 will receive the information without burden other potential relaying nodes 101. In yet another embodiment, the query-engine 1009 may decide not to send a reply to a query if it has just delivered the information via a query message or a broadcast reply message.

Following the determination to transmit and/or optimization of the one or more information request messages, the query engine 1009 determines or causes, at least in part, transmission of the one or more information request messages over the ad-hoc mesh network 109 (step 1115). This transmission occurs using the process for propagating messages over the ad-hoc mesh network 109 described above.

Figure 12:
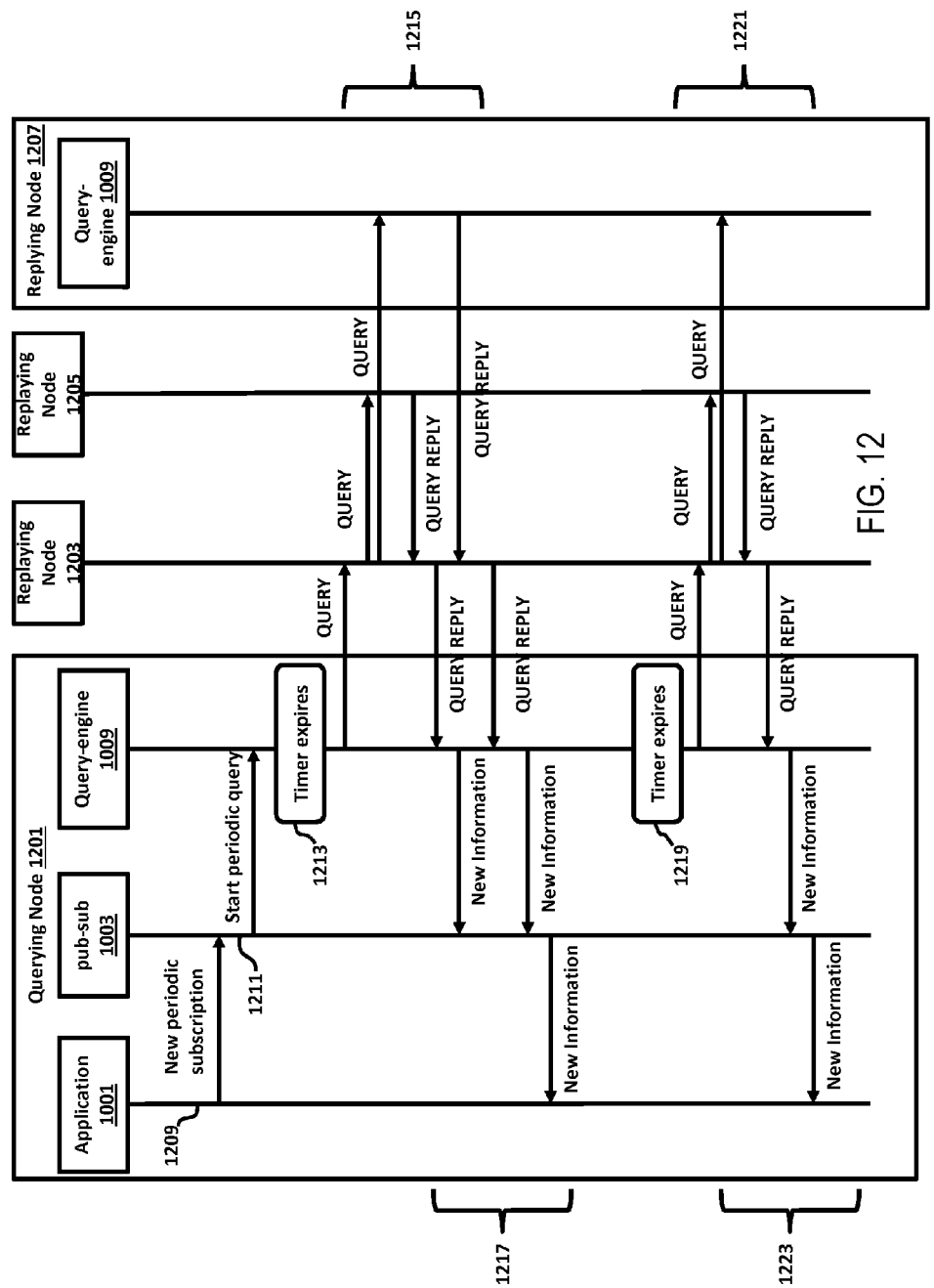
FIG. 12 is a ladder diagram that illustrates a sequence of messages and processes for coordinating information request messages for periodic subscriptions, according to one embodiment.

FIG. 12 is a ladder diagram that illustrates a sequence of messages and processes for coordinating information request messages for periodic subscriptions, according to one embodiment. A network process is represented by a thin vertical line. A step or message passed from one process to another is represented by horizontal arrows. A dashed horizontal arrow represents an optional step or message. The processes represented in FIG. 12 are the querying node 1201, relaying node 1203, and replying nodes 1205 and 1207. Within querying node 1201, the following additional processes are represented: application 1001, publish/subscribe functionality 1003, and query engine 1009. Within replying 1207, a process for the query engine 1009 is also represented. Although not shown, it is contemplated that the relaying node 1203 and the replying node 1205 also may include respective query engines 1009.

As previously noted, a periodic or temporal subscription indicates that an application requests the subscribed information periodically. In one embodiment, information request messages for temporal subscriptions are coordinated without determining context information because they are time dependent. Instead, the period information request messages are transmitted based on the specified frequency, interval, or schedule. At step 1209, an application 1001 of the querying node 1201 initiates a periodic subscription to information using the publish/subscribe functionality 1003. The publish-subscribe functionality 1003 then requests that the query engine 1009 initiate a corresponding periodic query for the subscribed information (step 1211).

Accordingly, the query engine 1009 initiates a periodic query timer. On expiration of the query time (step 1213), the query engine 1009 transmits a the periodic subscription query that causes propagation 1215 of the query message over the ad-hoc mesh network 109 to the relaying node 1203, the replying nodes 1205 and 1207, and the query engine 1009 of the replying node 1207. The query results in corresponding query reply messages from the replying nodes 1205 and 1207 which provide new information 1217 to the query engine 1009 of the querying node 1201. If the replying nodes 1205 and 1207 respond with responsive information, the query engine 1009 informs the application 1001 of the new information.

This process is then repeated periodically. Thus, as the query timer expires again and is reset for the next query (step 1219), the query engine 1009 causes another propagation 1221 of the query and resulting replies to generate new information 1223.

Figure 13:
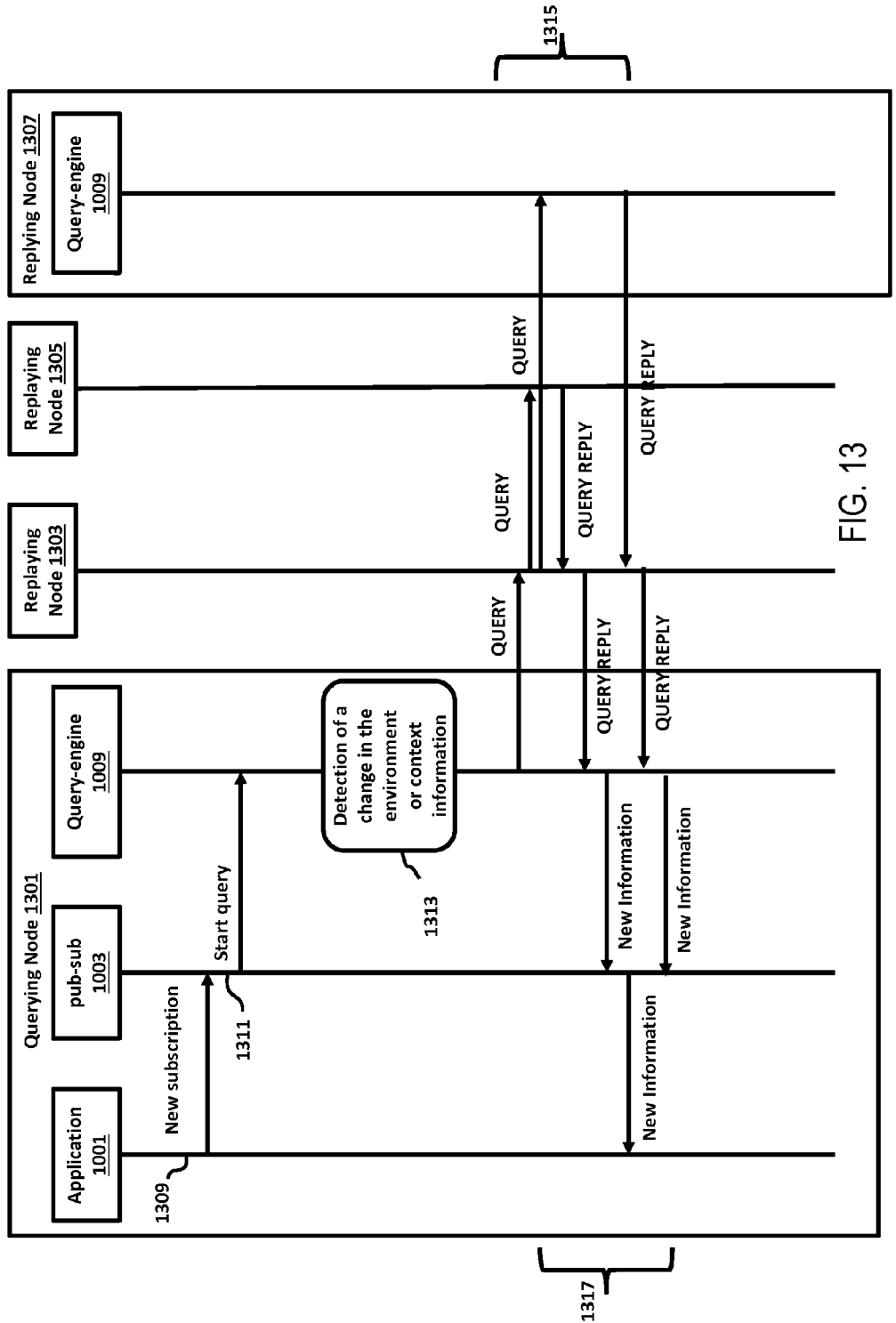
FIG. 13 is a ladder diagram that illustrates a sequence of messages and processes for coordinating information request messages for non-temporal subscriptions, according to one embodiment.

FIG. 13 is a ladder diagram that illustrates a sequence of messages and processes for coordinating information request messages for non-temporal subscriptions, according to one embodiment. A network process is represented by a thin vertical line. A step or message passed from one process to another is represented by horizontal arrows. A dashed horizontal arrow represents an optional step or message. The processes represented in FIG. 12 are the querying node 1301, relaying node 1303, and replying nodes 1305 and 1307. Within querying node 1301, the following additional processes are represented: application 1001, publish/subscribe functionality 1003, and query engine 1009. Within replying 1307, a process for the query engine 1009 is also represented. Although not shown, it is contemplated that the relaying node 1303 and the replying node 1305 also may include respective query engines 1009.

As previously noted, a non-temporal subscription provides subscribed information the subscribing application whenever the information is available rather than on a fixed schedule or frequency. In one embodiment, information request messages for non-temporal subscriptions are coordinated by triggering the transmission of information request messages based, at least in part, on context information available over the ad-hoc mesh network 109. At step 1309, an application 1001 of the querying node 1301 initiates a non-temporal subscription to information using the publish/subscribe functionality 1003. The publish-subscribe functionality 1003 then requests that the query engine 1009 initiate a corresponding query for the subscribed information (step 1311).

In this example, the query engine 1009 generates a query for the subscribe information, but does not immediately transmit it over the ad-hoc mesh network 109. Instead, the query engine 1009 waits to detect a change in the environment or context information of the ad-hoc mesh network 109 according to, for instance, the process 1100 of FIG. 11. On detecting such a change or when the context information indicates that it is appropriate to initiate the query, the query engine 1009 transmits a the non-temporal subscription query that causes propagation 1315 of the query message over the ad-hoc mesh network 109 to the relaying node 1303, the replying nodes 1305 and 1307, and the query engine 1009 of the replying node 1307. The query results in corresponding query reply messages from the replying nodes 1305 and 1307 which provide new information 1317 to the query engine 1009 of the querying node 1301. If the replying nodes 1305 and 1307 respond with responsive information, the query engine 1009 informs the application 1001 of the new information. This process is then repeated as needed based on the context information and the subscription parameters.

The processes described herein for coordinating information request messages over an ad-hoc mesh network may be advantageously implemented via software, hardware, firmware or a combination of software and/or firmware and/or hardware. For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 14:
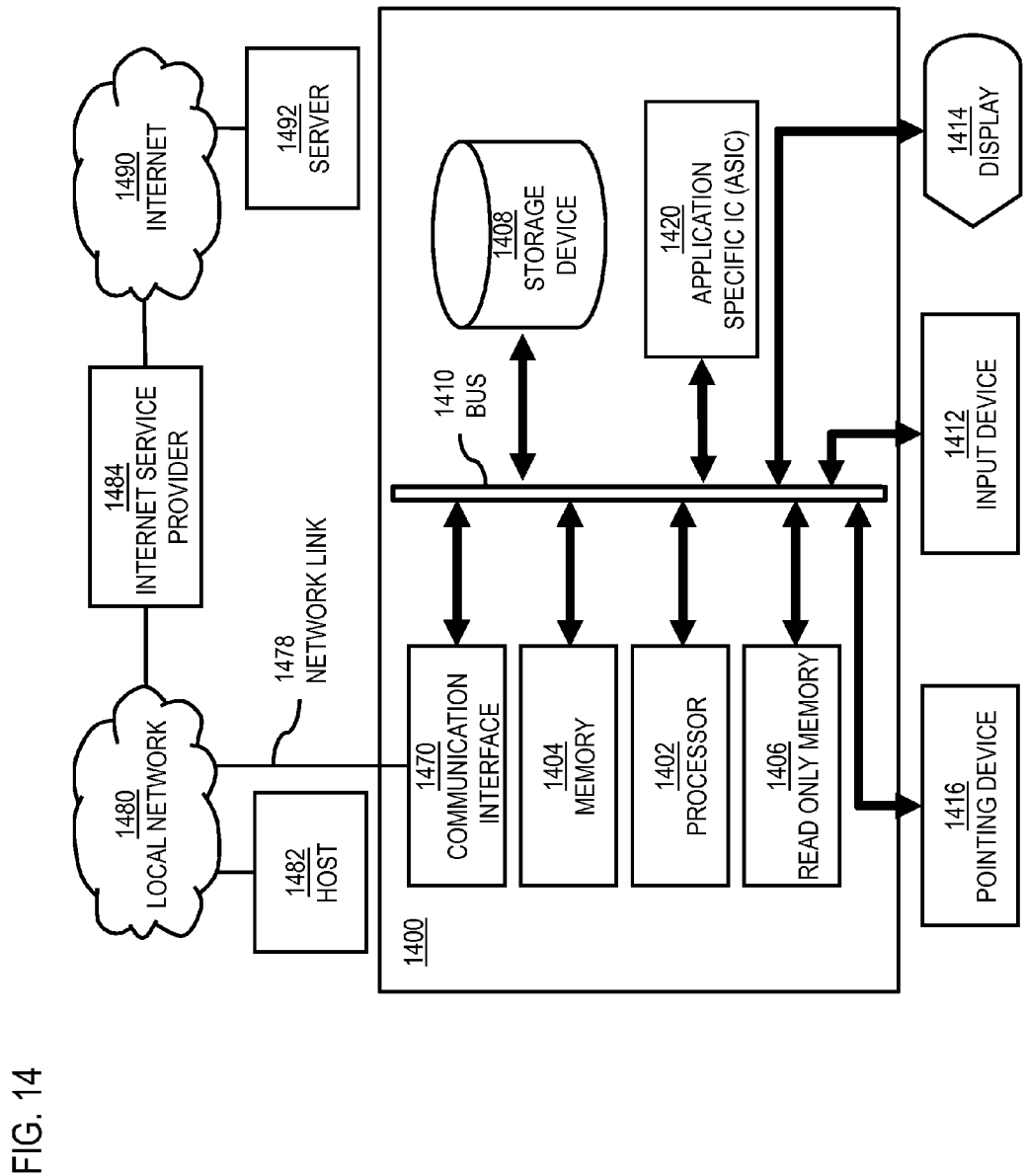
FIG. 14 is a diagram of hardware that can be used to implement an embodiment of the invention.

FIG. 14 illustrates a computer system 1400 upon which an embodiment of the invention may be implemented. Although computer system 1400 is depicted with respect to a particular device or equipment, it is contemplated that other devices or equipment (e.g., network elements, servers, etc.) within FIG. 14 can deploy the illustrated hardware and components of system 1400. Computer system 1400 is programmed (e.g., via computer program code or instructions) to coordinate information request messages over an ad-hoc mesh network as described herein and includes a communication mechanism such as a bus 1410 for passing information between other internal and external components of the computer system 1400. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 1400, or a portion thereof, constitutes a means for performing one or more steps of coordinating information request messages over an ad-hoc mesh network.

A bus 1410 includes one or more parallel conductors of information so that information is transferred quickly among devices coupled to the bus 1410. One or more processors 1402 for processing information are coupled with the bus 1410.

A processor (or multiple processors) 1402 performs a set of operations on information as specified by computer program code related to coordinating information request messages over an ad-hoc mesh network. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 1410 and placing information on the bus 1410. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 1402, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 1400 also includes a memory 1404 coupled to bus 1410. The memory 1404, such as a random access memory (RAM) or any other dynamic storage device, stores information including processor instructions for coordinating information request messages over an ad-hoc mesh network. Dynamic memory allows information stored therein to be changed by the computer system 1400. RAM allows a unit of information stored at a location called a memory address to be stored and retrieved independently of information at neighboring addresses. The memory 1404 is also used by the processor 1402 to store temporary values during execution of processor instructions. The computer system 1400 also includes a read only memory (ROM) 1406 or any other static storage device coupled to the bus 1410 for storing static information, including instructions, that is not changed by the computer system 1400. Some memory is composed of volatile storage that loses the information stored thereon when power is lost. Also coupled to bus 1410 is a non-volatile (persistent) storage device 1408, such as a magnetic disk, optical disk or flash card, for storing information, including instructions, that persists even when the computer system 1400 is turned off or otherwise loses power.

Information, including instructions for coordinating information request messages over an ad-hoc mesh network, is provided to the bus 1410 for use by the processor from an external input device 1412, such as a keyboard containing alphanumeric keys operated by a human user, or a sensor. A sensor detects conditions in its vicinity and transforms those detections into physical expression compatible with the measurable phenomenon used to represent information in computer system 1400. Other external devices coupled to bus 1410, used primarily for interacting with humans, include a display device 1414, such as a cathode ray tube (CRT), a liquid crystal display (LCD), a light emitting diode (LED) display, an organic LED (OLED) display, a plasma screen, or a printer for presenting text or images, and a pointing device 1416, such as a mouse, a trackball, cursor direction keys, or a motion sensor, for controlling a position of a small cursor image presented on the display 1414 and issuing commands associated with graphical elements presented on the display 1414. In some embodiments, for example, in embodiments in which the computer system 1400 performs all functions automatically without human input, one or more of external input device 1412, display device 1414 and pointing device 1416 is omitted.

In the illustrated embodiment, special purpose hardware, such as an application specific integrated circuit (ASIC) 1420, is coupled to bus 1410. The special purpose hardware is configured to perform operations not performed by processor 1402 quickly enough for special purposes. Examples of ASICs include graphics accelerator cards for generating images for display 1414, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 1400 also includes one or more instances of a communications interface 1470 coupled to bus 1410. Communication interface 1470 provides a one-way or two-way communication coupling to a variety of external devices that operate with their own processors, such as printers, scanners and external disks. In general the coupling is with a network link 1478 that is connected to a local network 1480 to a variety of external devices with their own processors are connected. For example, communication interface 1470 may be a parallel port or a serial port or a universal serial bus (USB) port on a personal computer. In some embodiments, communications interface 1470 is an integrated services digital network (ISDN) card or a digital subscriber line (DSL) card or a telephone modem that provides an information communication connection to a corresponding type of telephone line. In some embodiments, a communication interface 1470 is a cable modem that converts signals on bus 1410 into signals for a communication connection over a coaxial cable or into optical signals for a communication connection over a fiber optic cable. As another example, communications interface 1470 may be a local area network (LAN) card to provide a data communication connection to a compatible LAN, such as Ethernet. Wireless links may also be implemented. For wireless links, the communications interface 1470 sends or receives or both sends and receives electrical, acoustic or electromagnetic signals, including infrared and optical signals, that carry information streams, such as digital data. For example, in wireless handheld devices, such as mobile telephones like cell phones, the communications interface 1470 includes a radio band electromagnetic transmitter and receiver called a radio transceiver. In certain embodiments, the communications interface 1470 enables connection to the communication network 105 for coordinating information request messages over an ad-hoc mesh network.

The term "computer-readable medium" as used herein refers to any medium that participates in providing information to processor 1402, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 1408. Volatile media include, for example, dynamic memory 1404. Transmission media include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 1420.

Network link 1478 typically provides information communication using transmission media through one or more networks to other devices that use or process the information. For example, network link 1478 may provide a connection through local network 1480 to a host computer 1482 or to equipment 1484 operated by an Internet Service Provider (ISP). ISP equipment 1484 in turn provides data communication services through the public, world-wide packet-switching communication network of networks now commonly referred to as the Internet 1490.

A computer called a server host 1492 connected to the Internet hosts a process that provides a service in response to information received over the Internet. For example, server host 1492 hosts a process that provides information representing video data for presentation at display 1414. It is contemplated that the components of system 1400 can be deployed in various configurations within other computer systems, e.g., host 1482 and server 1492.

At least some embodiments of the invention are related to the use of computer system 1400 for implementing some or all of the techniques described herein. According to one embodiment of the invention, those techniques are performed by computer system 1400 in response to processor 1402 executing one or more sequences of one or more processor instructions contained in memory 1404. Such instructions, also called computer instructions, software and program code, may be read into memory 1404 from another computer-readable medium such as storage device 1408 or network link 1478. Execution of the sequences of instructions contained in memory 1404 causes processor 1402 to perform one or more of the method steps described herein. In alternative embodiments, hardware, such as ASIC 1420, may be used in place of or in combination with software to implement the invention. Thus, embodiments of the invention are not limited to any specific combination of hardware and software, unless otherwise explicitly stated herein.

The signals transmitted over network link 1478 and other networks through communications interface 1470, carry information to and from computer system 1400. Computer system 1400 can send and receive information, including program code, through the networks 1480, 1490 among others, through network link 1478 and communications interface 1470. In an example using the Internet 1490, a server host 1492 transmits program code for a particular application, requested by a message sent from computer 1400, through Internet 1490, ISP equipment 1484, local network 1480 and communications interface 1470. The received code may be executed by processor 1402 as it is received, or may be stored in memory 1404 or in storage device 1408 or any other non-volatile storage for later execution, or both. In this manner, computer system 1400 may obtain application program code in the form of signals on a carrier wave.

Various forms of computer readable media may be involved in carrying one or more sequence of instructions or data or both to processor 1402 for execution. For example, instructions and data may initially be carried on a magnetic disk of a remote computer such as host 1482. The remote computer loads the instructions and data into its dynamic memory and sends the instructions and data over a telephone line using a modem. A modem local to the computer system 1400 receives the instructions and data on a telephone line and uses an infra-red transmitter to convert the instructions and data to a signal on an infra-red carrier wave serving as the network link 1478. An infrared detector serving as communications interface 1470 receives the instructions and data carried in the infrared signal and places information representing the instructions and data onto bus 1410. Bus 1410 carries the information to memory 1404 from which processor 1402 retrieves and executes the instructions using some of the data sent with the instructions. The instructions and data received in memory 1404 may optionally be stored on storage device 1408, either before or after execution by the processor 1402.

FIG. 15 illustrates a chip set or chip 1500 upon which an embodiment of the invention may be implemented. Chip set 1500 is programmed to coordinate information request messages over an ad-hoc mesh network as described herein and includes, for instance, the processor and memory components described with respect to FIG. 14 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 1500 can be implemented in a single chip. It is further contemplated that in certain embodiments the chip set or chip 1500 can be implemented as a single "system on a chip." It is further contemplated that in certain embodiments a separate ASIC would not be used, for example, and that all relevant functions as disclosed herein would be performed by a processor or processors. Chip set or chip 1500, or a portion thereof, constitutes a means for performing one or more steps of providing user interface navigation information associated with the availability of functions. Chip set or chip 1500, or a portion thereof, constitutes a means for performing one or more steps of coordinating information request messages over an ad-hoc mesh network.

In one embodiment, the chip set or chip 1500 includes a communication mechanism such as a bus 1501 for passing information among the components of the chip set 1500. A processor 1503 has connectivity to the bus 1501 to execute instructions and process information stored in, for example, a memory 1505. The processor 1503 may include one or more processing cores with each core configured to perform independently. A multi-core processor enables multiprocessing within a single physical package. Examples of a multi-core processor include two, four, eight, or greater numbers of processing cores. Alternatively or in addition, the processor 1503 may include one or more microprocessors configured in tandem via the bus 1501 to enable independent execution of instructions, pipelining, and multithreading. The processor 1503 may also be accompanied with one or more specialized components to perform certain processing functions and tasks such as one or more digital signal processors (DSP) 1507, or one or more application-specific integrated circuits (ASIC) 1509. A DSP 1507 typically is configured to process real-world signals (e.g., sound) in real time independently of the processor 1503. Similarly, an ASIC 1509 can be configured to performed specialized functions not easily performed by a more general purpose processor. Other specialized components to aid in performing the inventive functions described herein may include one or more field programmable gate arrays (FPGA) (not shown), one or more controllers (not shown), or one or more other special-purpose computer chips.

In one embodiment, the chip set or chip 1500 includes merely one or more processors and some software and/or firmware supporting and/or relating to and/or for the one or more processors.

The processor 1503 and accompanying components have connectivity to the memory 1505 via the bus 1501. The memory 1505 includes both dynamic memory (e.g., RAM, magnetic disk, writable optical disk, etc.) and static memory (e.g., ROM, CD-ROM, etc.) for storing executable instructions that when executed perform the inventive steps described herein to coordinate information request messages over an ad-hoc mesh network. The memory 1505 also stores the data associated with or generated by the execution of the inventive steps.

Figure 16:
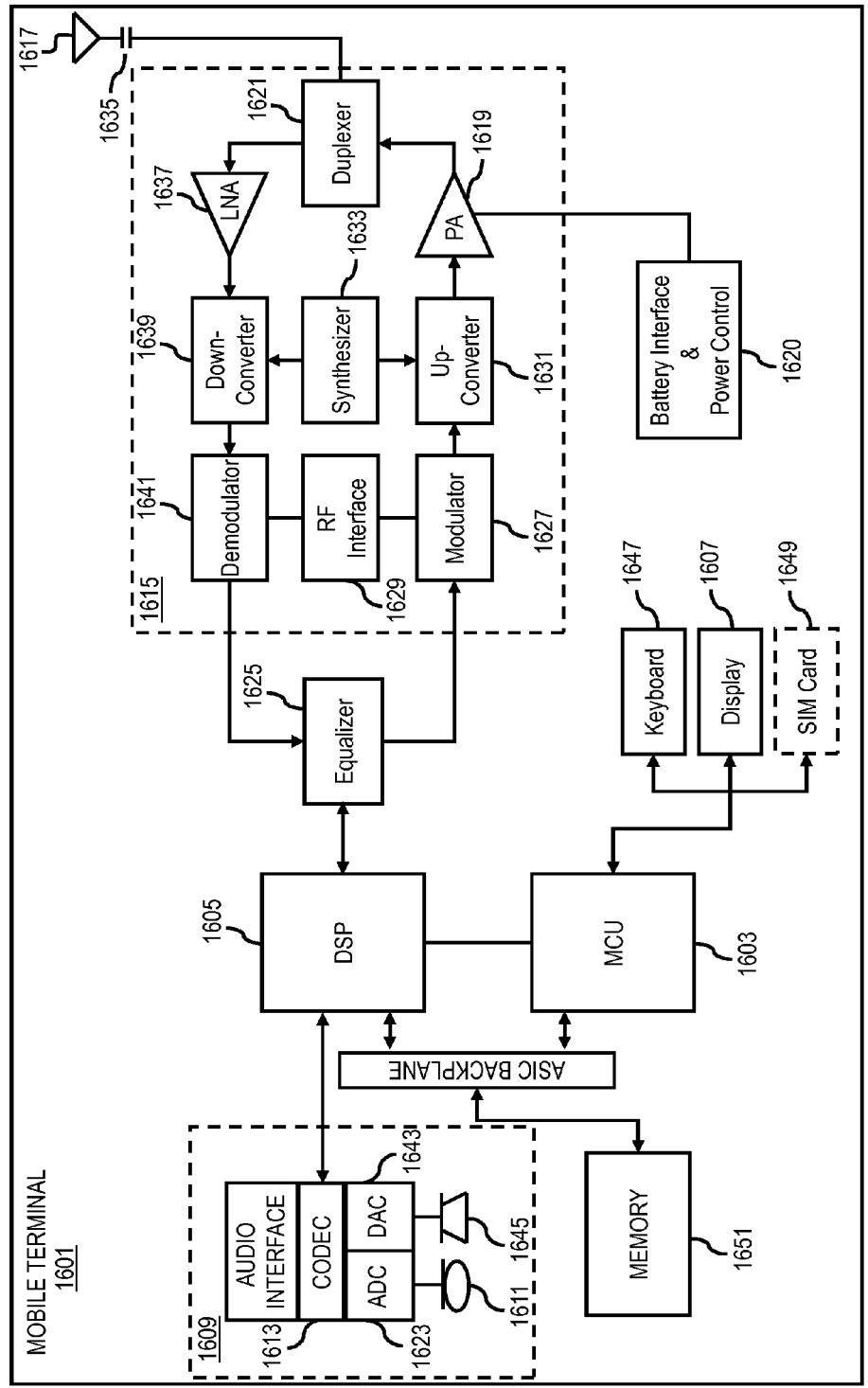
FIG. 16 is a diagram of a mobile station (e.g., handset) that can be used to implement an embodiment of the invention.

FIG. 16 is a diagram of exemplary components of a mobile terminal (e.g., handset) for communications, which is capable of operating in the system of FIG. 1, according to one embodiment. In some embodiments, mobile terminal 1601, or a portion thereof, constitutes a means for performing one or more steps of coordinating information request messages over an ad-hoc mesh network. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 1603, a Digital Signal Processor (DSP) 1605, and a receiver/transmitter unit including a microphone gain control unit and a speaker gain control unit. A main display unit 1607 provides a display to the user in support of various applications and mobile terminal functions that perform or support the steps of coordinating information request messages over an ad-hoc mesh network. The display 1607 includes display circuitry configured to display at least a portion of a user interface of the mobile terminal (e.g., mobile telephone). Additionally, the display 1607 and display circuitry are configured to facilitate user control of at least some functions of the mobile terminal. An audio function circuitry 1609 includes a microphone 1611 and microphone amplifier that amplifies the speech signal output from the microphone 1611. The amplified speech signal output from the microphone 1611 is fed to a coder/decoder (CODEC) 1613.

A radio section 1615 amplifies power and converts frequency in order to communicate with a base station, which is included in a mobile communication system, via antenna 1617. The power amplifier (PA) 1619 and the transmitter/modulation circuitry are operationally responsive to the MCU 1603, with an output from the PA 1619 coupled to the duplexer 1621 or circulator or antenna switch, as known in the art. The PA 1619 also couples to a battery interface and power control unit 1620.

In use, a user of mobile terminal 1601 speaks into the microphone 1611 and his or her voice along with any detected background noise is converted into an analog voltage. The analog voltage is then converted into a digital signal through the Analog to Digital Converter (ADC) 1623. The control unit 1603 routes the digital signal into the DSP 1605 for processing therein, such as speech encoding, channel encoding, encrypting, and interleaving. In one embodiment, the processed voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like, or any combination thereof.

The encoded signals are then routed to an equalizer 1625 for compensation of any frequency-dependent impairments that occur during transmission though the air such as phase and amplitude distortion. After equalizing the bit stream, the modulator 1627 combines the signal with a RF signal generated in the RF interface 1629. The modulator 1627 generates a sine wave by way of frequency or phase modulation. In order to prepare the signal for transmission, an up-converter 1631 combines the sine wave output from the modulator 1627 with another sine wave generated by a synthesizer 1633 to achieve the desired frequency of transmission. The signal is then sent through a PA 1619 to increase the signal to an appropriate power level. In practical systems, the PA 1619 acts as a variable gain amplifier whose gain is controlled by the DSP 1605 from information received from a network base station. The signal is then filtered within the duplexer 1621 and optionally sent to an antenna coupler 1635 to match impedances to provide maximum power transfer. Finally, the signal is transmitted via antenna 1617 to a local base station. An automatic gain control (AGC) can be supplied to control the gain of the final stages of the receiver. The signals may be forwarded from there to a remote telephone which may be another cellular telephone, any other mobile phone or a land-line connected to a Public Switched Telephone Network (PSTN), or other telephony networks.

Voice signals transmitted to the mobile terminal 1601 are received via antenna 1617 and immediately amplified by a low noise amplifier (LNA) 1637. A down-converter 1639 lowers the carrier frequency while the demodulator 1641 strips away the RF leaving only a digital bit stream. The signal then goes through the equalizer 1625 and is processed by the DSP 1605. A Digital to Analog Converter (DAC) 1643 converts the signal and the resulting output is transmitted to the user through the speaker 1645, all under control of a Main Control Unit (MCU) 1603 which can be implemented as a Central Processing Unit (CPU) (not shown).

The MCU 1603 receives various signals including input signals from the keyboard 1647. The keyboard 1647 and/or the MCU 1603 in combination with other user input components (e.g., the microphone 1611) comprise a user interface circuitry for managing user input. The MCU 1603 runs a user interface software to facilitate user control of at least some functions of the mobile terminal 1601 to coordinate information request messages over an ad-hoc mesh network. The MCU 1603 also delivers a display command and a switch command to the display 1607 and to the speech output switching controller, respectively. Further, the MCU 1603 exchanges information with the DSP 1605 and can access an optionally incorporated SIM card 1649 and a memory 1651. In addition, the MCU 1603 executes various control functions required of the terminal. The DSP 1605 may, depending upon the implementation, perform any of a variety of conventional digital processing functions on the voice signals. Additionally, DSP 1605 determines the background noise level of the local environment from the signals detected by microphone 1611 and sets the gain of microphone 1611 to a level selected to compensate for the natural tendency of the user of the mobile terminal 1601.

The CODEC 1613 includes the ADC 1623 and DAC 1643. The memory 1651 stores various data including call incoming tone data and is capable of storing other data including music data received via, e.g., the global Internet. The software module could reside in RAM memory, flash memory, registers, or any other form of writable storage medium known in the art. The memory device 1651 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 1649 carries, for instance, important information, such as the cellular phone number, the carrier supplying service, subscription details, and security information. The SIM card 1649 serves primarily to identify the mobile terminal 1601 on a radio network. The card 1649 also contains a memory for storing a personal telephone number registry, text messages, and user specific mobile terminal settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. An apparatus comprising:
   at least one processor; and
   at least one memory including computer program code,
   the at least one memory and the computer program code configured to, with the at least one processor, cause the apparatus to perform at least the following,
   receive at least one request to transmit one or more information request messages over an ad-hoc mesh network;
   determine context information associated with at least a portion of the ad-hoc mesh network, one or more nodes within the at least a portion of the ad-hoc mesh network, or a combination thereof, wherein context information is collected from data traffic and comprises network traffic, network topology, node sensor information, published information, or exchanged messages;
   determine whether weights are to be applied to the context information based on the collected context information and in an instance when the weights are applied, determine respective weights for one or more elements of the context information; and
   transmit the one or more information request messages over the ad-hoc mesh network based, at least in part, on the context information and on whether the respective weights exceed a threshold value.

2. An apparatus of claim 1, wherein the apparatus determines the context information based, at least in part, on network traffic, network topology, sensor information, published information, or combination thereof.

3. An apparatus of claim 1, wherein the apparatus determines that a new node has joined the ad-hoc mesh network, wherein transmission of the one or more information request messages is based, at least in part, on the determination with respect to the new node.

4. An apparatus of claim 1, wherein the one or more information request messages are associated with one or more transmission parameters, and wherein transmission of the one or more information request messages is based, at least in part, on the one or more transmission parameters.

5. An apparatus of claim 1, wherein the one or more information request messages are generated by one or more applications using, at least in part, a publish/subscribe mechanism over the ad-hoc mesh network.

6. An apparatus of claim 1, wherein the apparatus concatenates at least a portion of the one or more information requests messages into a common message,
wherein transmission of the one or more information request messages comprises transmission of the common message.

7. An apparatus of claim 1, wherein the one or more information request messages include one or more information publication messages, one or more information subscription messages, or a combination thereof, the method further comprising:
transmitting at least one of the information publication messages with at least one of the information subscription messages.

8. An apparatus of claim 1, wherein the apparatus transmits the one or more information request messages as either a broadcast message or
a unicast message based, at least in part, on the context information.

9. An apparatus of claim 1, wherein the apparatus is a mobile phone further comprising:
user interface circuitry and user interface software configured to facilitate user control of at least some functions of the mobile phone through use of a display and configured to respond to user input; and
a display and display circuitry configured to display at least a portion of a user interface of the mobile phone, the display and display circuitry configured to facilitate user control of at least some functions of the mobile phone.

10. An apparatus of claim 1, wherein the mobile phone includes a radio for device-to-device communication.

11. An apparatus of claim 1, wherein the apparatus is further caused to determine whether weights are to be applied to the context information based on the collected context information and in an instance when the weights are not applied, analyze the context information for changes.

12. A method comprising:
receiving at least one request to transmit one or more information request messages over an ad-hoc mesh network;
determining, using a processor, context information associated with at least a portion of the ad-hoc mesh network, one or more nodes within the at least a portion of the ad-hoc mesh network, or a combination thereof, wherein context information is collected data traffic and comprises network traffic, network topology, node sensor information, published information, or exchanged messages;
determining whether weights are to be applied to the context information based on the collected context information and in an instance when the weights are applied, determining respective weights for one or more elements of the context information; and
transmitting of the one or more information request messages over the ad-hoc mesh network based, at least in part, on the context information and on whether the respective weights exceed a threshold value.

13. A method of claim 12, further comprising:
determining the context information based, at least in part, on network traffic, network topology, sensor information, published information, or combination thereof.

14. A method of claim 12, further comprising:
determining that a new node has joined the ad-hoc mesh network,
wherein transmission of the one or more information request messages is based, at least in part, on the determination with respect to the new node.

15. A method of claim 12, wherein the one or more information request messages are associated with one or more transmission parameters, and wherein transmission of the one or more information request messages is based, at least in part, on the one or more transmission parameters.

16. A method of claim 12, wherein the one or more information request messages are generated by one or more applications using, at least in part, a publish/subscribe mechanism over the ad-hoc mesh network.

17. A method of claim 12, further comprising:
concatenating at least a portion of the one or more information requests messages into a common message,
wherein transmitting the one or more information request messages comprises transmitting the common message.

18. A method of claim 12, wherein the one or more information request messages include one or more information publication messages, one or more information subscription messages, or a combination thereof, the method further comprising:
transmitting at least one of the information publication messages with at least one of the information subscription messages and
transmitting the one or more information request messages as either a broadcast message or a unicast message based, at least in part, on the context information.

19. A method of claim 12, further comprising determining whether weights are to be applied to the context information based on the collected context information and in an instance when the weights are not applied, analyze the context information for changes.

20. A computer program product comprising a non-transitory computer-readable storage medium having computer executable program code portions stored therein, the computer executable program code portions comprising program code instructions configured for:
receiving at least one request to transmit one or more information request messages over an ad-hoc mesh network;
determining context information associated with at least a portion of the ad-hoc mesh network, one or more nodes within the at least a portion of the ad-hoc mesh network, or a combination thereof, wherein context information is collected from data traffic and comprises network traffic, network topology, node sensor information, published information, or exchanged messages;
determining whether weights are to be applied to the context information based on the collected context information and in an instance when the weights are applied, determining respective weights for one or more elements of the context information; and transmitting the one or more information request messages over the ad-hoc mesh network based, at least in part, on the context information and on whether the respective weights exceed a threshold value.

* * * * *